United States Patent [19]

Schiller

[11] Patent Number: 4,696,046
[45] Date of Patent: Sep. 22, 1987

[54] MATCHER

[75] Inventor: Michael Schiller, Riverdale, N.Y.

[73] Assignee: Fingermatrix, Inc., North White Plains, N.Y.

[21] Appl. No.: 845,154

[22] Filed: Mar. 27, 1986

Related U.S. Application Data

[63] Continuation-in-part of Ser. No. 762,118, Aug. 2, 1985, abandoned, which is a continuation-in-part of Ser. No. 718,870, Apr. 2, 1985, abandoned.

[51] Int. Cl.$^4$ ............................................. G06H 9/00
[52] U.S. Cl. .......................................... 382/5; 382/4; 382/30; 382/34
[58] Field of Search ..................... 382/4, 5, 30, 34, 36; 356/71

[56] References Cited

U.S. PATENT DOCUMENTS

| | | | |
|---|---|---|---|
| 3,823,261 | 7/1974 | Bolsey | 382/34 |
| 4,288,782 | 9/1981 | Bader et al. | 382/34 |
| 4,467,437 | 8/1984 | Tsuruta et al. | 382/30 |
| 4,479,236 | 10/1984 | Sakoe | 382/34 |
| 4,525,859 | 6/1985 | Bowles et al. | 382/5 |
| 4,581,760 | 4/1986 | Schiller et al. | 382/4 |

Primary Examiner—Leo H. Boudreau
Assistant Examiner—Joseph Mancuso
Attorney, Agent, or Firm—McAulay, Fields, Fisher, Goldstein & Nissen

[57] ABSTRACT

A set of Search identification points derived from an optical scan of a finger are compared against File identification points for the same finger. A multiple comparator divides the finger image into multiple segments. The Search and File points from each segment are compared separately. A difference table (D.T.) provides a proximity value Q for each search point. The D.T. is purged of all entries representing multiple Search points. The purge keeps those entries having the highest Q value. The purged D.T. with recalculated Q values is the basis for correcting the position of each Search point on the image plane to compensate for shift in finger position and for the variable distortion and changes that come about in a finger over time and upon successive applications of the finger to input scan. The corrected Search points are compared against the File points to establish a new D.T. A proximity value Q for each entry on this D.T. is calculated and a proximity value Q for the entire table is calculated. These proximity values in view of the number of entries on the difference table are used to verify identification in a scoring routine.

19 Claims, 24 Drawing Figures

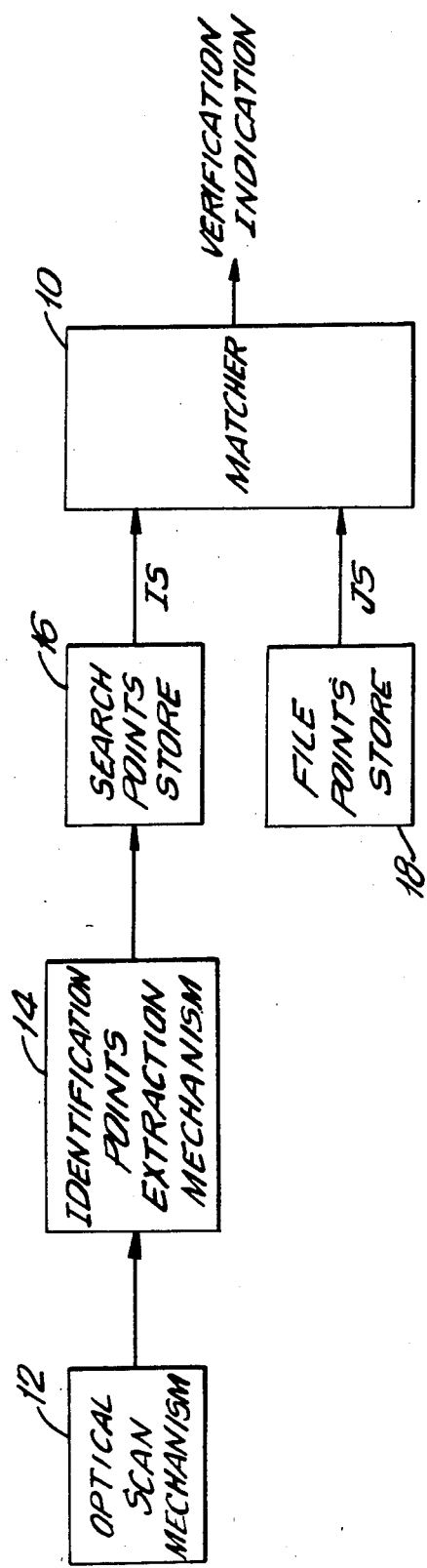

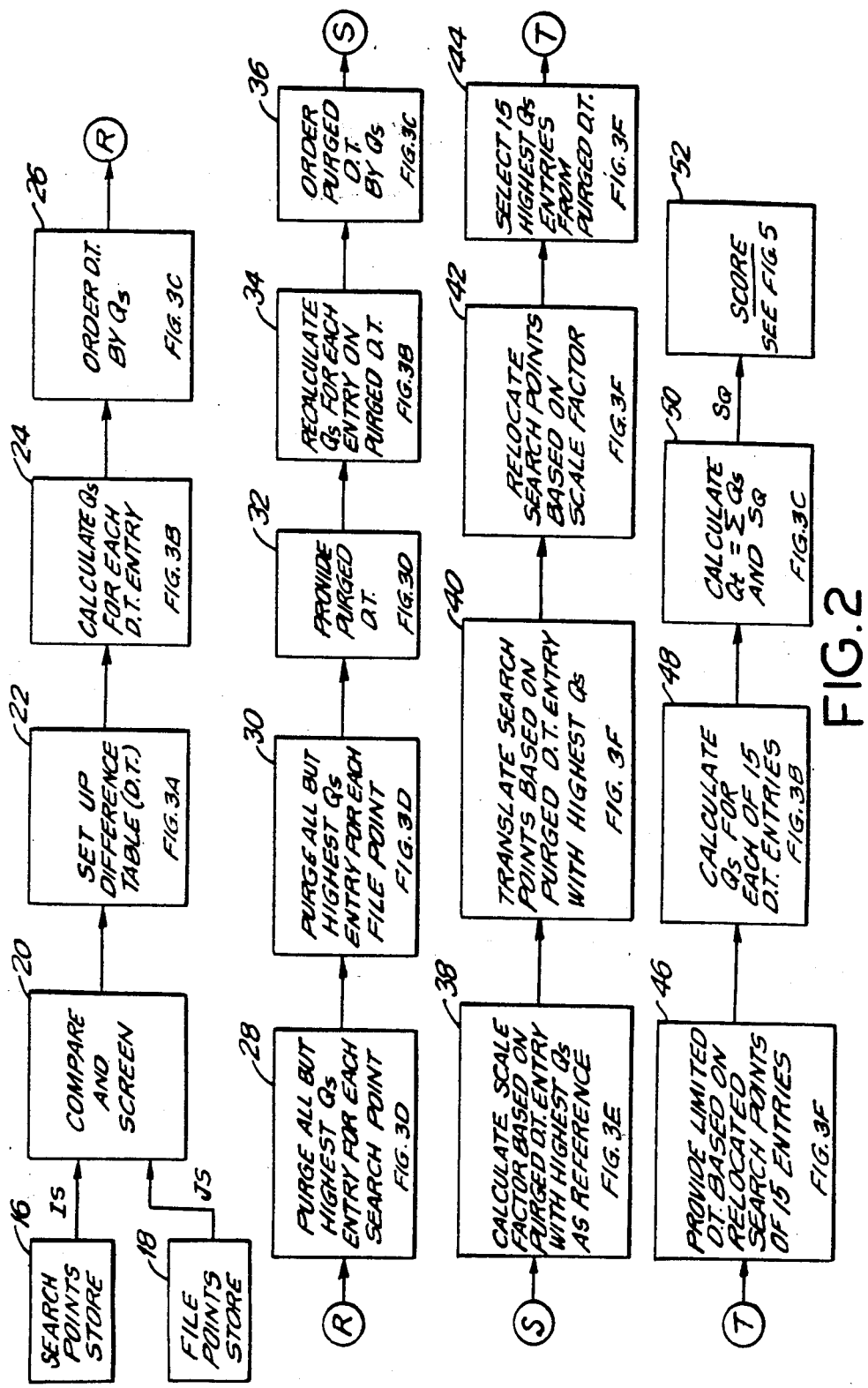

EXAMPLE OF RELOCATED SEARCH MINUTIAE IN NEW STABLE FORMULA

| i | j | XA | YA | X | Y | S | DX | DY | DΘ |
|---|---|---|---|---|---|---|---|---|---|
| 1 | 1 | 13 | -32 | 174 | 243 | 1 | 7 | 2 | -2 |
| 2 | 2 | 0 | 0 | 188 | 211 | 2 | 0 | 0 | 0 |
| 3 | 3 | -70 | 23 | 263 | 188 | 3 | 4 | -6 | 1 |
| 4 | 5 | -51 | 60 | 243 | 151 | 4 | 1 | 1 | 1 |

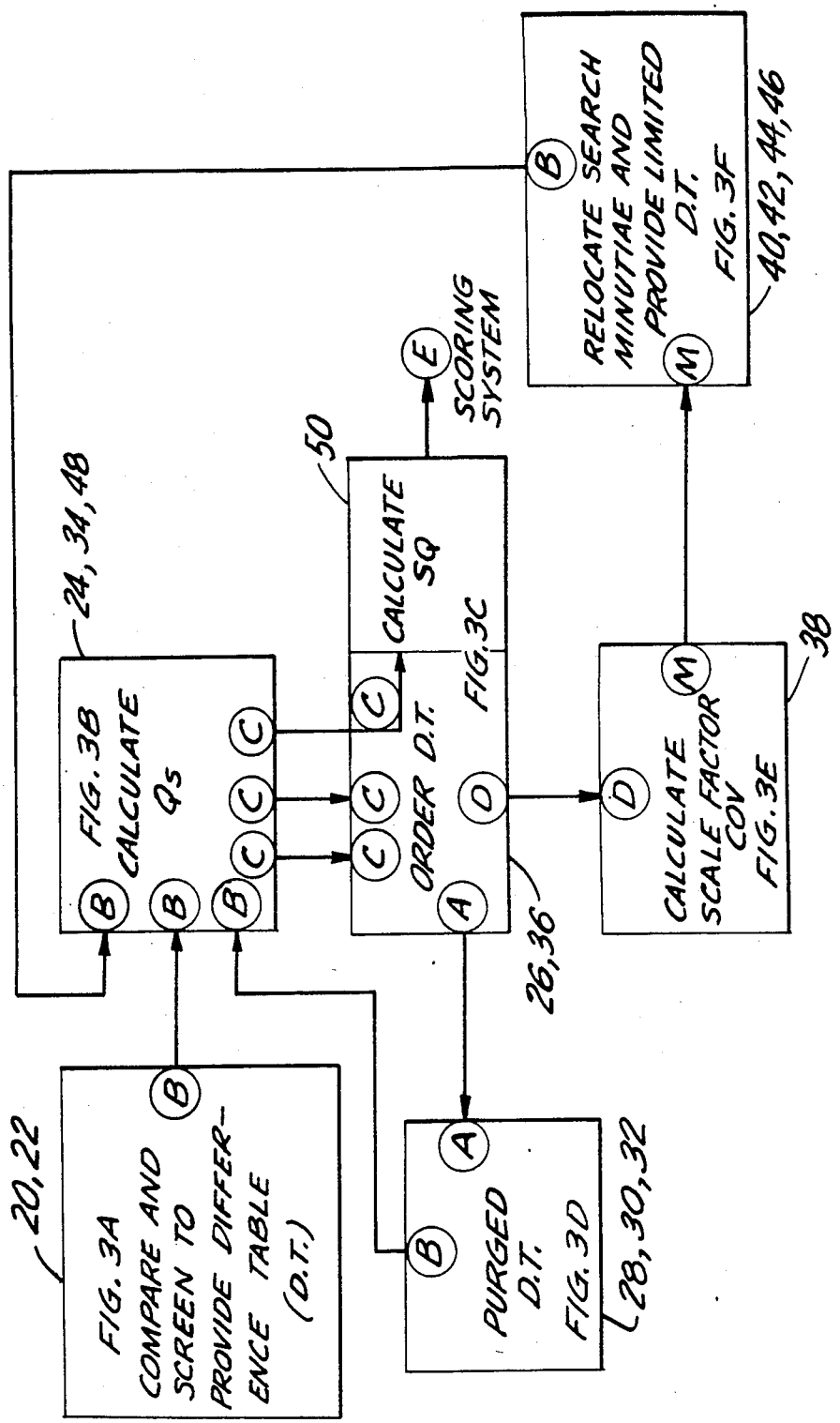

| QT PERFECT TABLE |||
|---|---|---|
| ST | POSSIBLE PAIRING | POSSIBLE PAIRING * KR QT ST |
| 4 | 6 | 42 |
| 5 | 10 | 70 |
| 6 | 15 | 105 |
| 7 | 21 | 147 |
| 8 | 28 | 196 |
| 9 | 36 | 252 |
| 10 | 45 | 315 |
| 11 | 55 | 385 |
| 12 | 66 | 462 |
| 13 | 78 | 546 |
| 14 | 91 | 637 |
| 15 | 105 | 735 |

MAX. ST IS 15 BECAUSE OF Z
KR = BKR = 7 AFTER CORRECTION

FIG. 5C

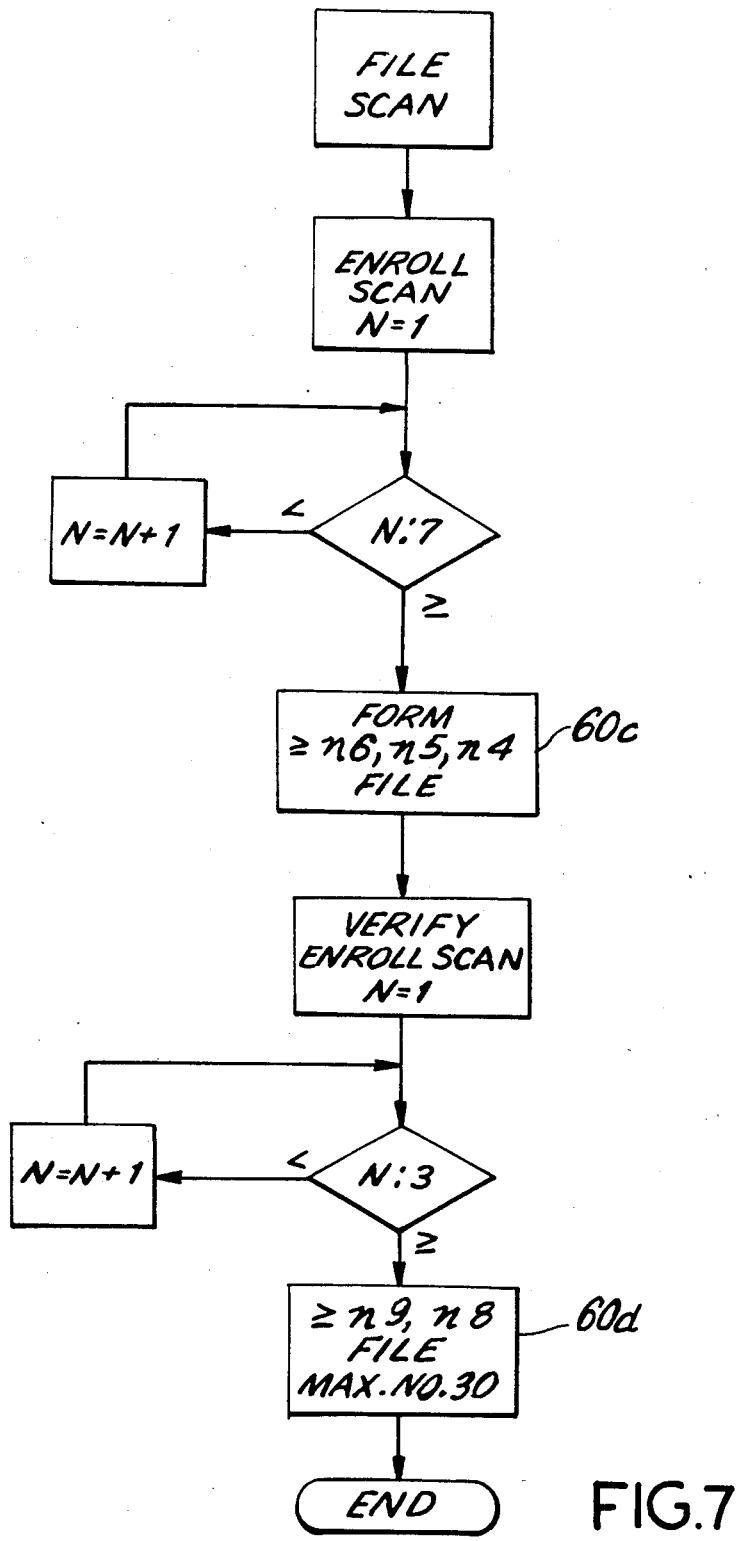

MATCHER

REFERENCE TO RELATED APPLICATIONS

This application is a continuation-in-part of a U.S. patent application Ser. No. 762,118 filed Aug. 2, 1985 and entitled MATCHER, now abandoned; said Ser. No. 762,118 in turn was a continuation-in-part of U.S. patent application Ser. No. 718,870 filed Apr. 2, 1985 and entitled MATCHER, now abandoned.

BACKGROUND OF THE INVENTION

This invention relates in general to an automatic computer controlled technique for matching a set of points in a reference file record (hereinafter "File") against a set of points in a subject or search record (hereinafter "Search"), wherein each of the File and Search points have values associated with certain predetermined parameters. More particularly, this invention relates to a fingerprint matcher in which the positional parameters of a set of minutia points in a File are compared against the positional parameters of a set of Search minutia points to determine whether or not it sufficiently matches so that the Search subject can be verified.

Fingerprint matcher mechanisms are known. One such Matcher is described in Wegstein, J. H., *The M-40 Fingerprint Matcher*, National Bureau of Standards Technical Note 878, U.S. Government Printing Office, Washington, D.C. 1975. The matcher mechanism described in the Wegstein reference employs the position of each File minutia and Search minutia in X and Y coordinates and the angular value in degrees. As described in Wegstein, each File point is compared with each Search point, in each of these X,Y and angle parameters so as to provide displacement values for a difference table. A difference table is a table in which each entry is a comparison of a Search point against a File point. The table includes the displacement between the two points in the X direction, the displacement between the two points in the Y direction and may also include the angular displacement between the two minutia points being compared. A plot of the X displacement values and the Y displacement values creates a difference plane.

Certain clusters of points in the difference table are used to provide an indication of the extent to which the Search fingerprint might be displaced or rotated relative to the fingerprint from which the set of File points was obtained. Certain figures of merit or matching scores are obtained. Only if the matching score exceeds certain thresholds, is the Search fingerprint deemed to correspond with the File fingerprint.

A further improved matcher mechanism is described in Wegstein, Joseph H., Automated Fingerprint Identification System, National Bureau of Standards publication 500-89, issued February 1982.

The utility of a matcher is a function of the speed with which it operates and its error rate. There are two types of error. A type I error is the failure to verify a match when the subject finger is indeed the same as the finger from which the File was obtained. This is an incorrect rejection in an access system. A type II error is the verification of a subject fingerprint which in fact is not the same as the fingerprint from which the File was made. This is an incorrect admission in an access system.

The value of any matcher mechanism is the extent to which the matcher contributes to increasing the speed of operation of a verification system, to reducing type I errors and to reducing type II errors.

There is a trade off between these three operating characteristics and the amount of distortion and lack of registration which can be tolerated. A major, if not the major, problem in matching fingerprint derived data is due to the plasticity of the finger. The resultant variation in finger impression from time to time results in substantial image variation.

Accordingly, it is a purpose of this invention to provide an enhanced matcher in which an improved trade off is obtained between the characteristics of speed, type I error, type II error, and ability to accept distortion and lack of registration.

It helps to keep in mind the significance of certain terminology. In particular, the following terminology recurs throughout the disclosure.

The Matcher device of this invention involves a number of major components which operate together to provide the total decision making in identification that is appropriately termed matching. More particularly, the Matcher has four separately scaled comparator segments which are integrated so as to provide a variable scale matching function. The Matcher also includes a scorer mechanism. However for the Matcher to operate to provide decision making, it must also have storage for the File minutia points and a storage for the Search minutia points. It is a combination of all of these components that constitutes the Matcher.

The difference table includes X differential values and Y differential values. The difference plane is one on which the X differential and Y differential values of the difference table are plotted. The difference table (D.T. herein) and the difference plane have to be kept in mind as distinct from the image plane on which the minutia points appear. Thus an entry on the difference plane is a point (a) whose X coordinate represents the difference along the X axis of the image plane between a given file point and a given search point and (b) whose Y coordinate represents the difference along the Y axis of the image plane between that file point and search point.

The term "Q" is used in different contexts with different sub-scripts to generally refer to how tightly various points are bound to one another. It is a measurement of relative proximity. Is is roughly analogous to spatial peaking, with reference to space on the difference plane not on the image plane. The term $Q_c$ will refer to a measure of how close two points on the difference plane are to one another. The term $Q_s$ will provide a measure of how close a particular point on the difference plane is to all the rest of the points in the difference plane. And the measurement $Q_t$ will provide an indication of how close to each other are all of the points on the difference plane. But generically this measurement of proximity on the difference plane will be referred to as Q. It should be noted that the term QT is used herein, particularly in the FIGS., interchangeably with $Q_t$ to mean the same thing.

The minutia referred to herein are the classical minutia, namely line endings and line bifurcations. These are the known type of minutia which are traditionally used to identify a fingerprint. The location of each minutia on the image plane is indicated in X and Y coordinates and is represented by the picture element (pixel) which contains the end point of the minutia. The angle of the minutia in the image plane is also employed to identify the minutia and can be employed as part of the matching mechanism. The embodiment of the invention described herein employs that angle only in terms of an initial qualification criteria for entry on the difference table. The angle is not thereafter used in the embodiment described although the matcher mechanism can be generalized to include angle differential values in the difference table as a contributor to the Q factor.

BRIEF DESCRIPTION

Briefly, in one embodiment, this invention involves a fingerprint identification system in which a set of Search identification points derived from an optical scan of a finger are compared against a set of File identification points for the same finger of the individual involved. These identification points are individual points in an X and Y plane that represent stable minutia. In order to minimize the effect of the distortions and changes that occur when the same finger is presented for scanning at different periods of time, the matcher system of this invention divides the finger into multiple segments and goes through separate comparator and compensation routines, treating each segment.

In order to compensate for the distortion and changes which occur even within one of these segments, when a finger is presented from time to time, a technique of providing a correction factor based on a difference table analysis is employed. Within each segment, the Search points and File points are compared to provide an initial (first) difference table based on the distances between the points being compared in the X axis and Y axis. A proximity value Q is calculated for each entry on the difference table. Based on these proximity values, the initial difference table is purged of all but one entry representing each Search point. The higher Q value points are the ones retained.

This much reduced purged (second) difference table is then used as a basis for recalculating a proximity value for each entry on that purged table. The entry on the purged table with the highest proximity value Q is treated as a point of origin on the difference plane in that the DX and DY values are reduced to zero. A comparable translation is made for the other points on the difference plane. This treats the Search point/File point duo which constitutes the highest Q value on the difference table as if the two points where coincident. With this shift, a correction factor is calculated based on the average remaining difference plane spread between Search and File point pairs on the purged difference table. The appropriate shift and correction factors are applied to the image plane position of the Search points represented on the purged difference table.

A third difference table is established based on the corrected Search point positions. The third difference table is screened for difference table entries representing Search and File points that remain further apart than a predetermined number of pixels and is also limited to a predetermined number of entries based on those having the highest proximity values in the purged difference table. This now more limited (fourth) difference table is used as a basis for recalculating the proximity values for each entry therein. These recalculated proximity values are used as a basis for scoring the comparison to determine identification.

The scoring technique also employs parameters that include the number of entries on the limited difference table, the number of entries on the purged difference table, the proximity score of the entire purged difference table, and a total segment score which is based on a ratio of the number of lines in the limited difference table and the number of lines in the purged difference table.

THE DRAWINGS

FIG. 1 is a block diagram illustrating the relationship of the matcher mechanism of this invention to the equipment that provides the set of File minutia points and Search minutia points to be compared in the matcher, which matcher provides a Q value, other figures of merit and an indication of verification.

FIG. 2 is a block diagram illustrating the processing of the matcher of this invention.

FIGS. 3H and 3I correspond to FIGS. 3E and 3F respectively.

Figure 3A:
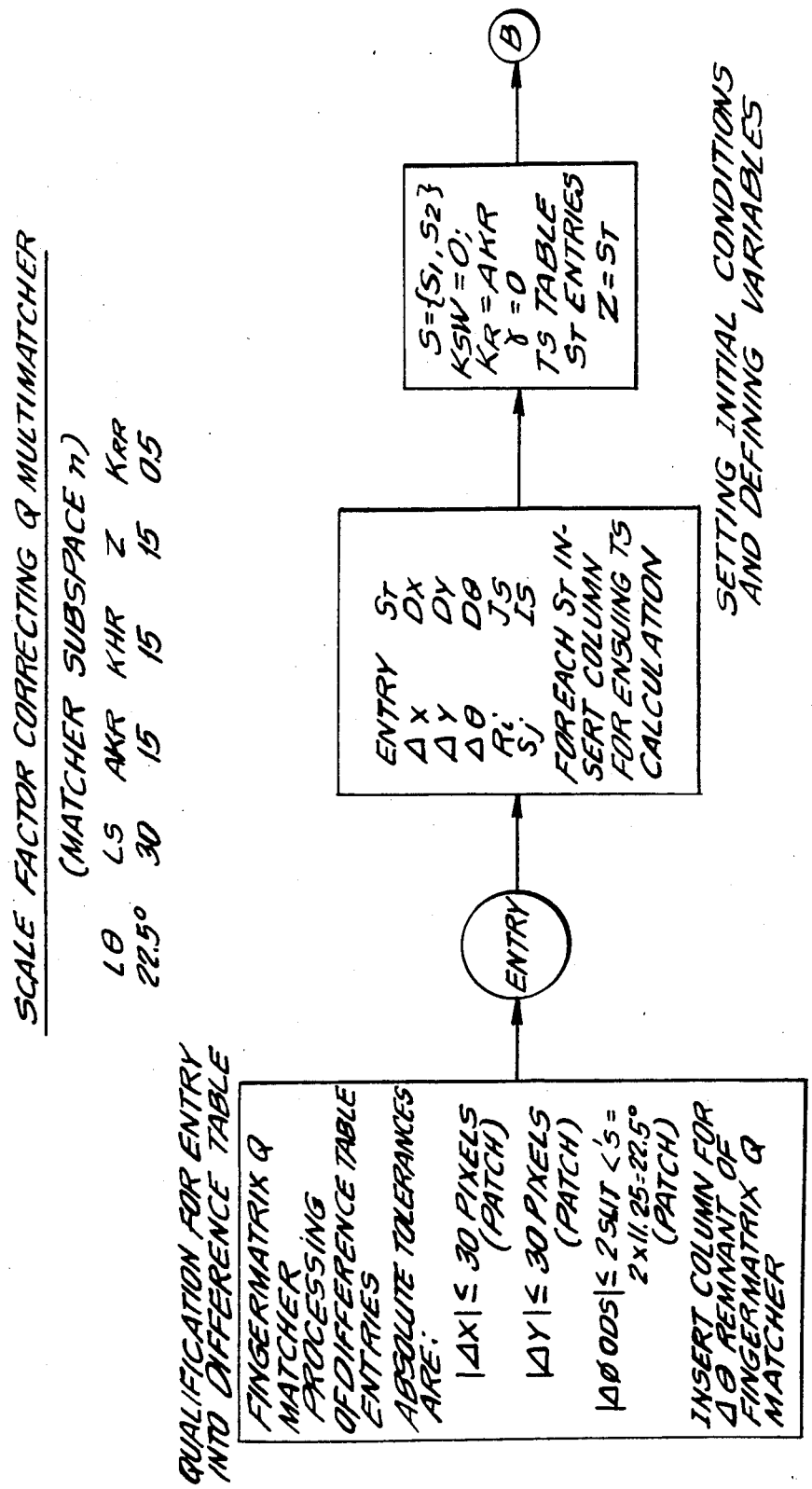
FIGS. 3A through 3F is a diagram that is primarily a flow chart illustrating in greater detail the comparator and correction processing set forth in FIG. 2. To facilitate understanding the transition from one of these components to the others.
Figure 3B:
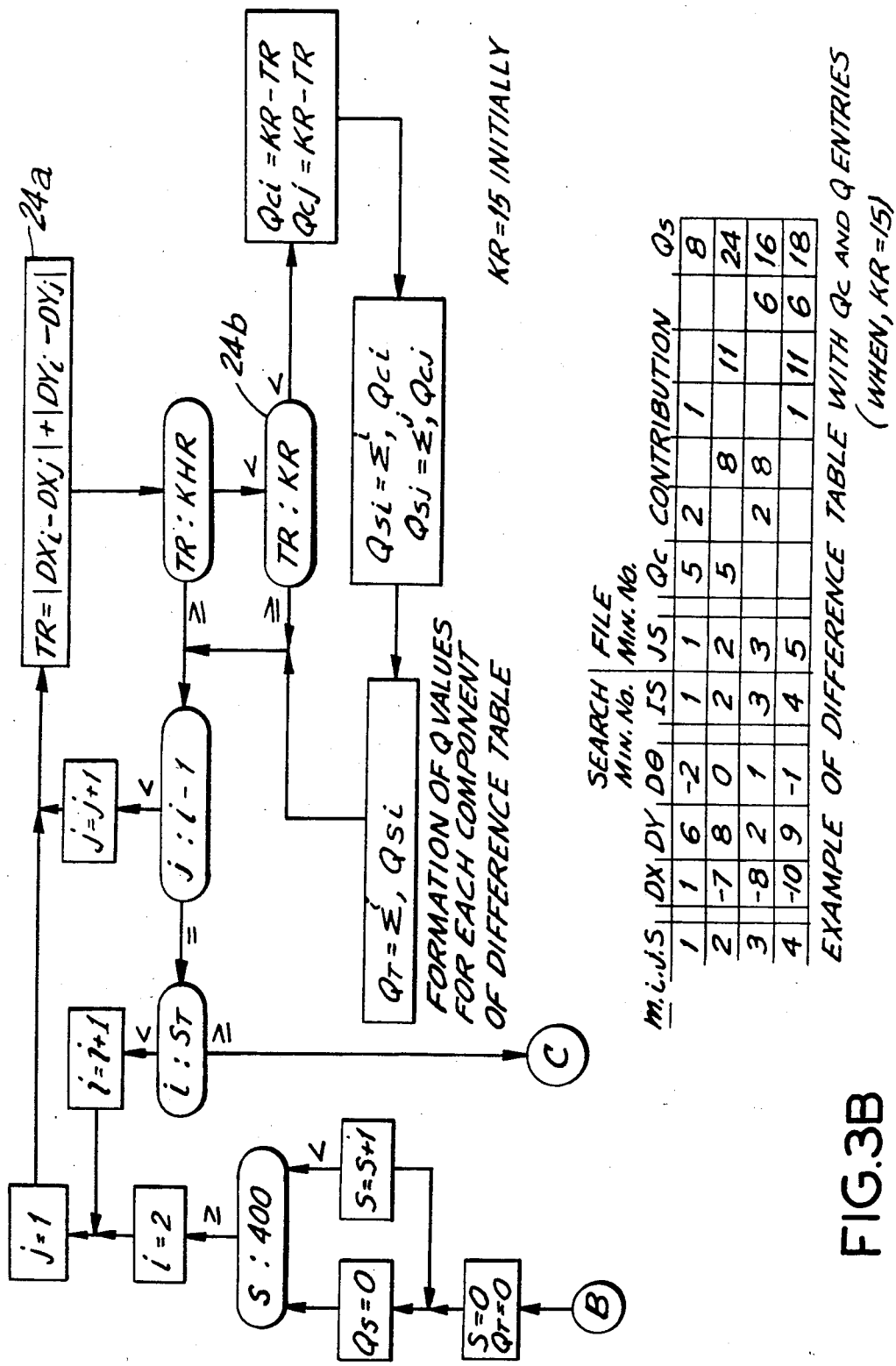
Figure 3C:
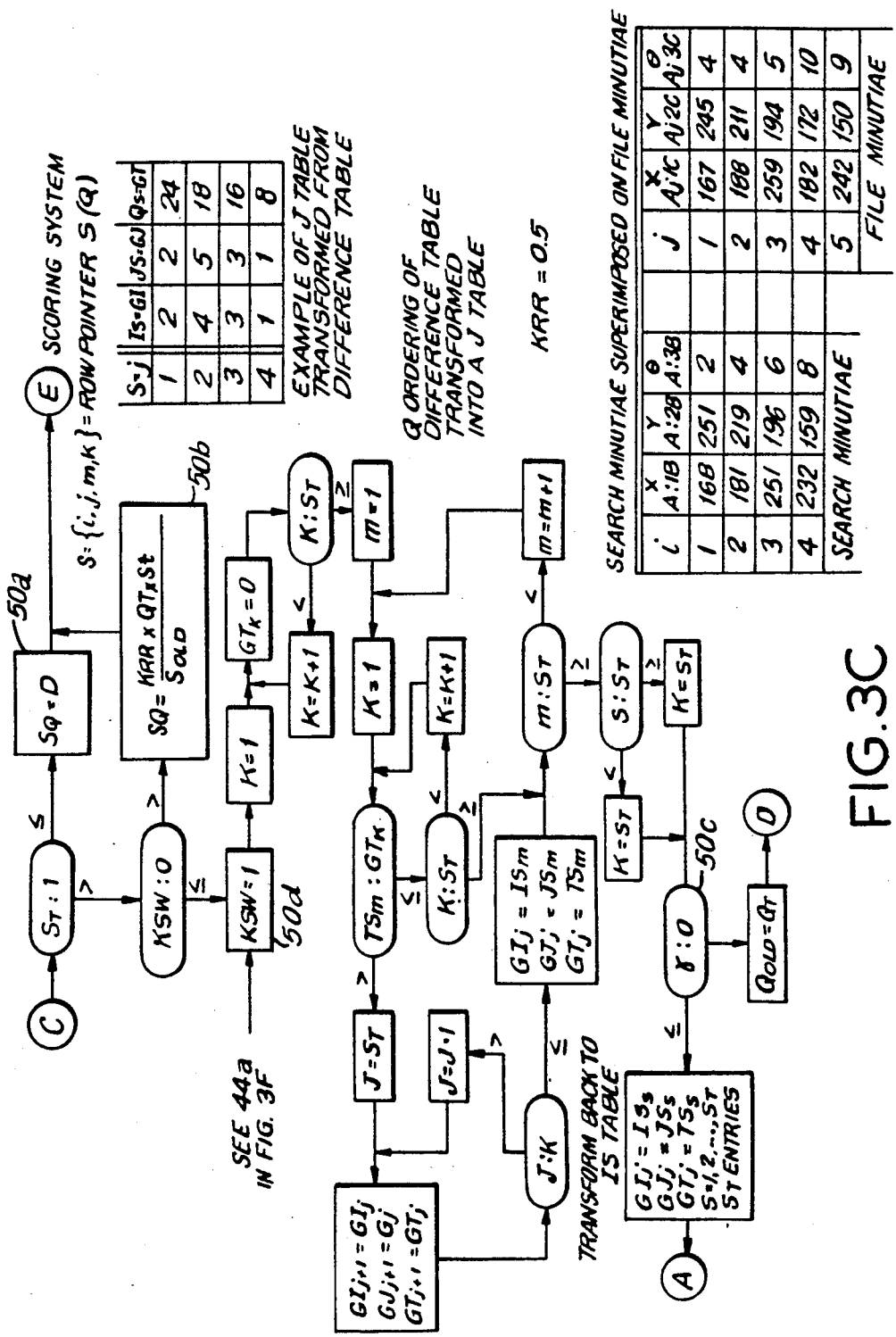
Figure 3D:
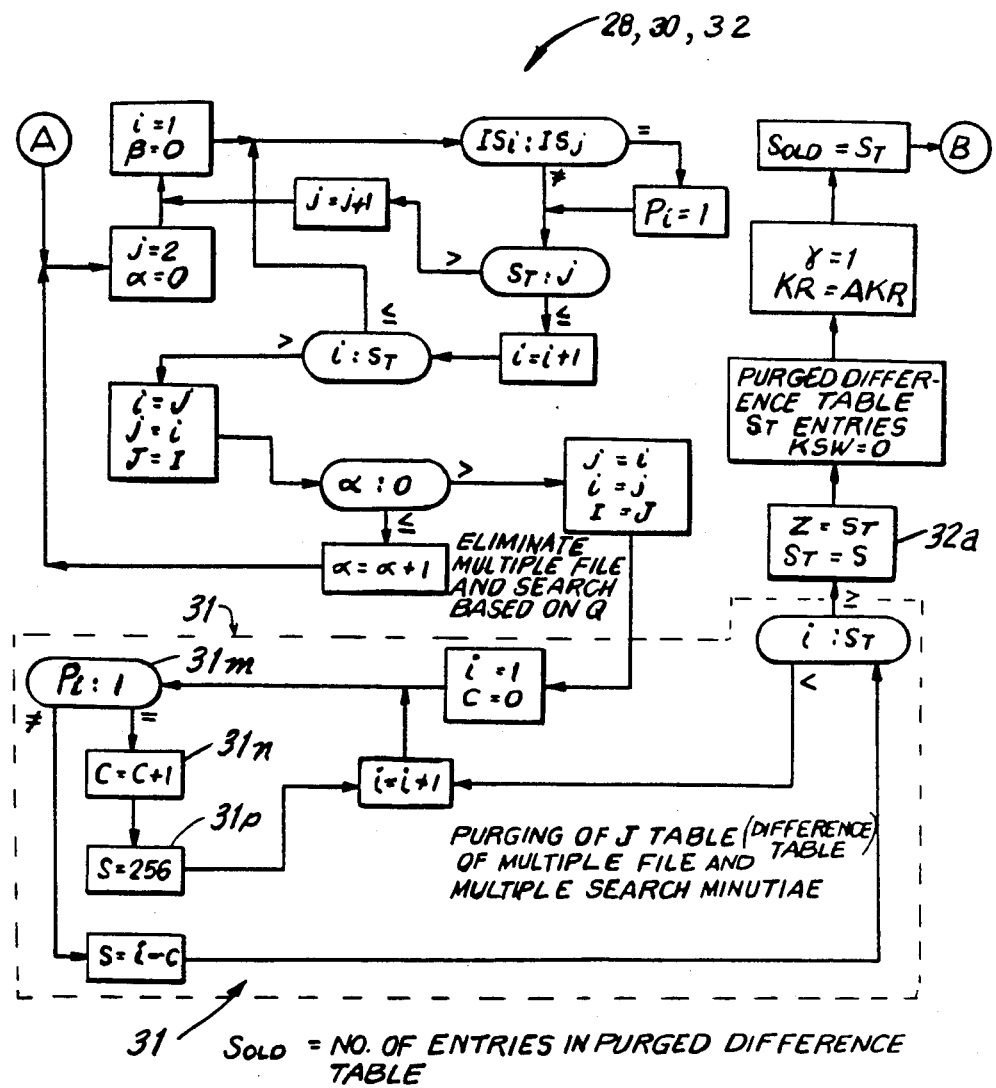
Figure 3E:
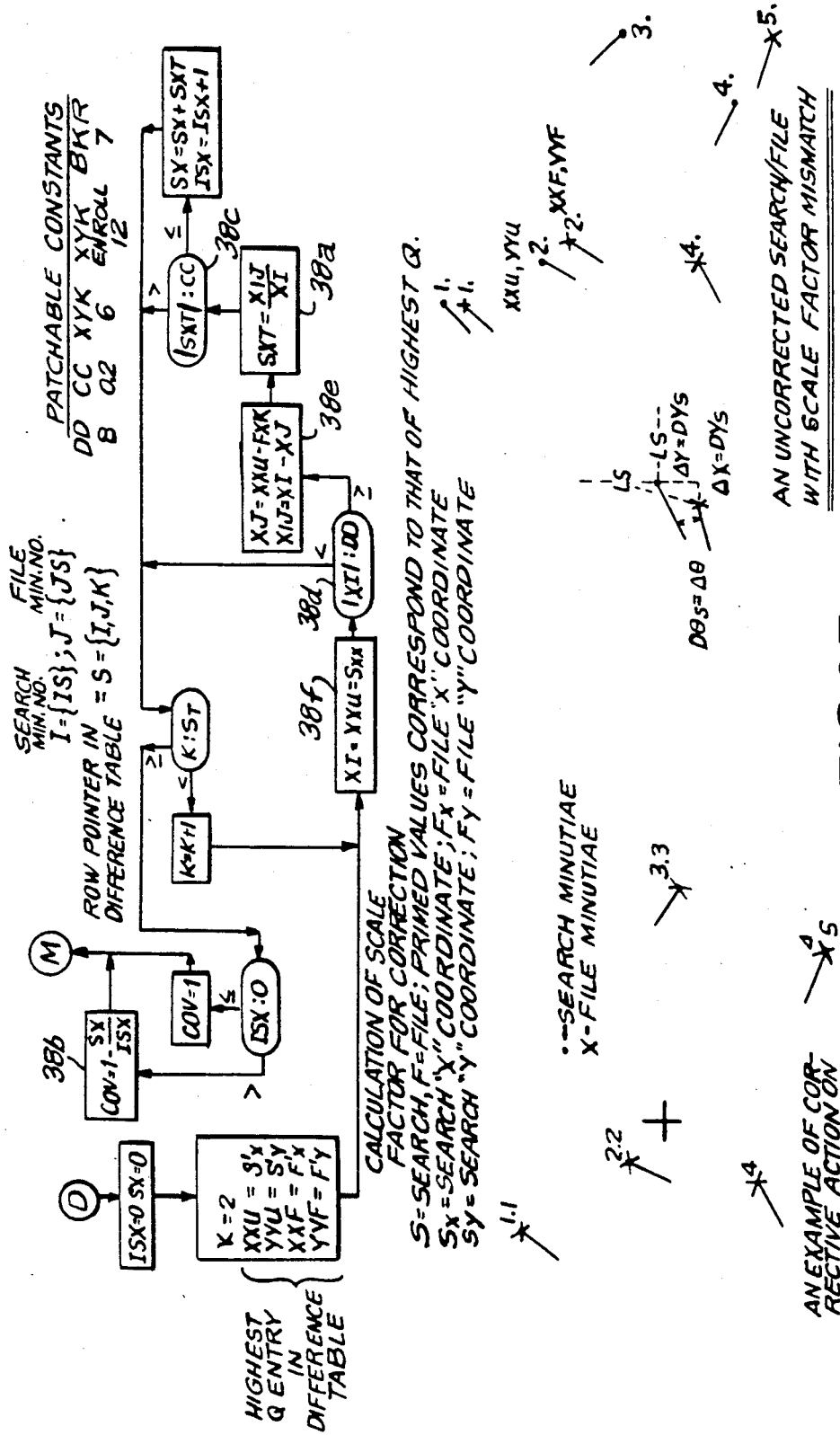
Figure 3F:
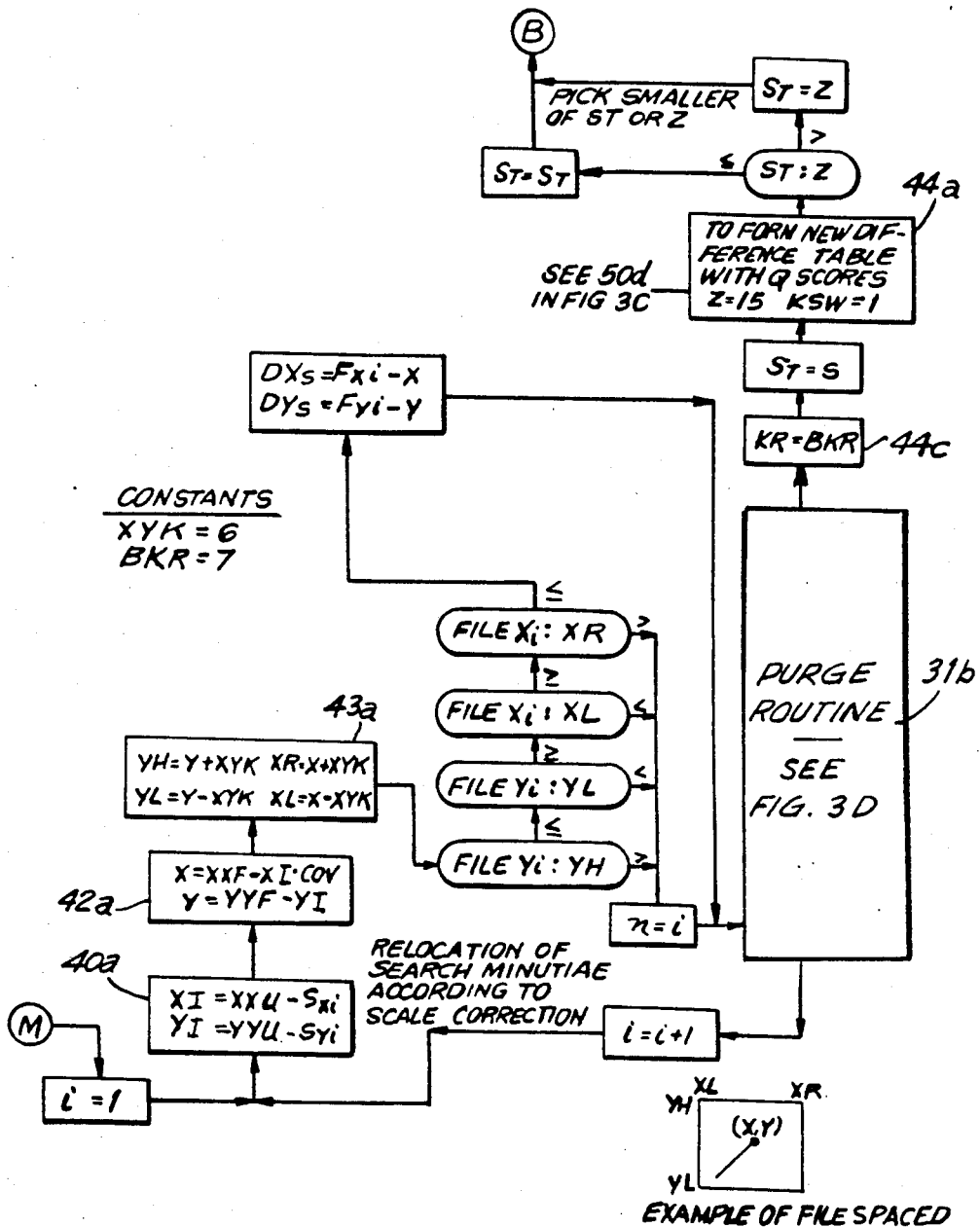
Figure 3H:
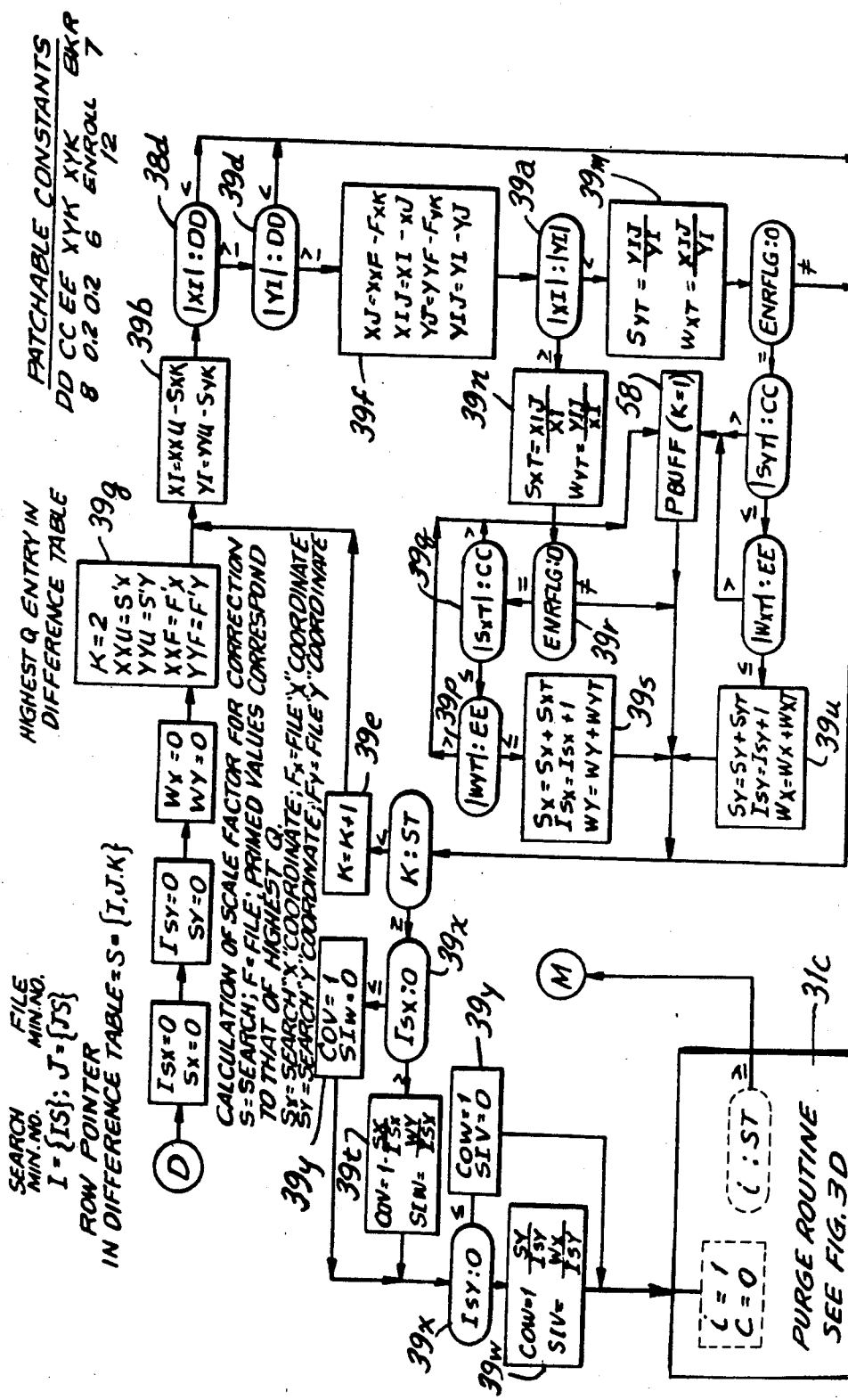
FIGS. 3H and 3I show a varient on the FIG.3A-3F embodiment in which correction factors are provided in the Y axis as well as in the X axis.
Figure 3I:
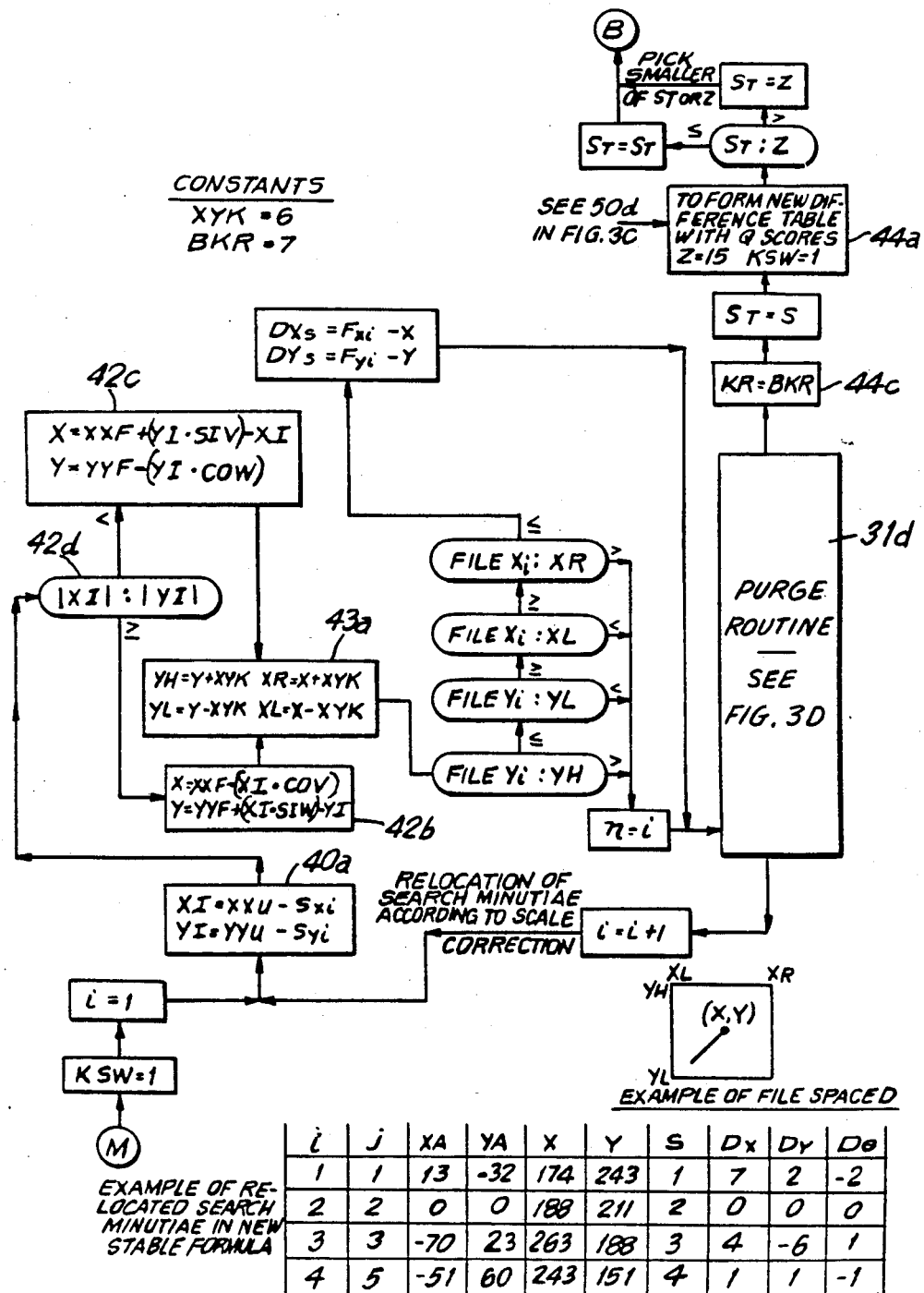
Figure 3J:
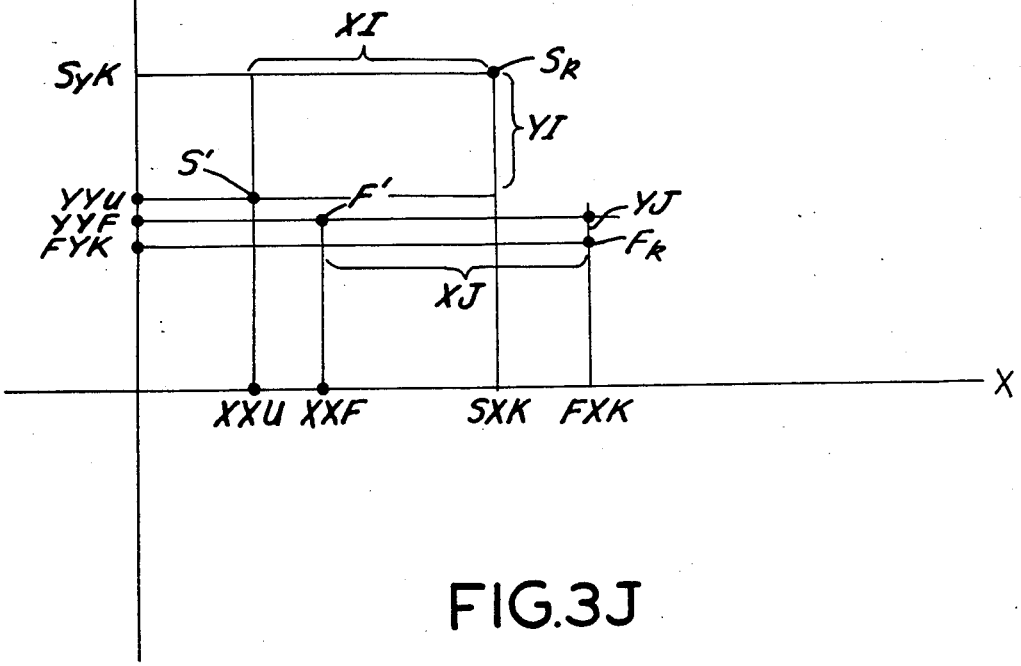
FIG. 3G shows the relationship between the subject matter shown in each of the FIGS. 3A through 3F.

FIG. 3J illustrates four points in the image plane. These four points are the File Point and Search Point pair S' and F' which has the highest Q value on the difference table. Another two points illustrated are a difference table pair Sk and Fk which are being compared to the pair S' and F' respectively for the purpose of calculating the scale factor components SXT and WYT as indicated at operating box 38a of FIG.3H.

Figure 4A:
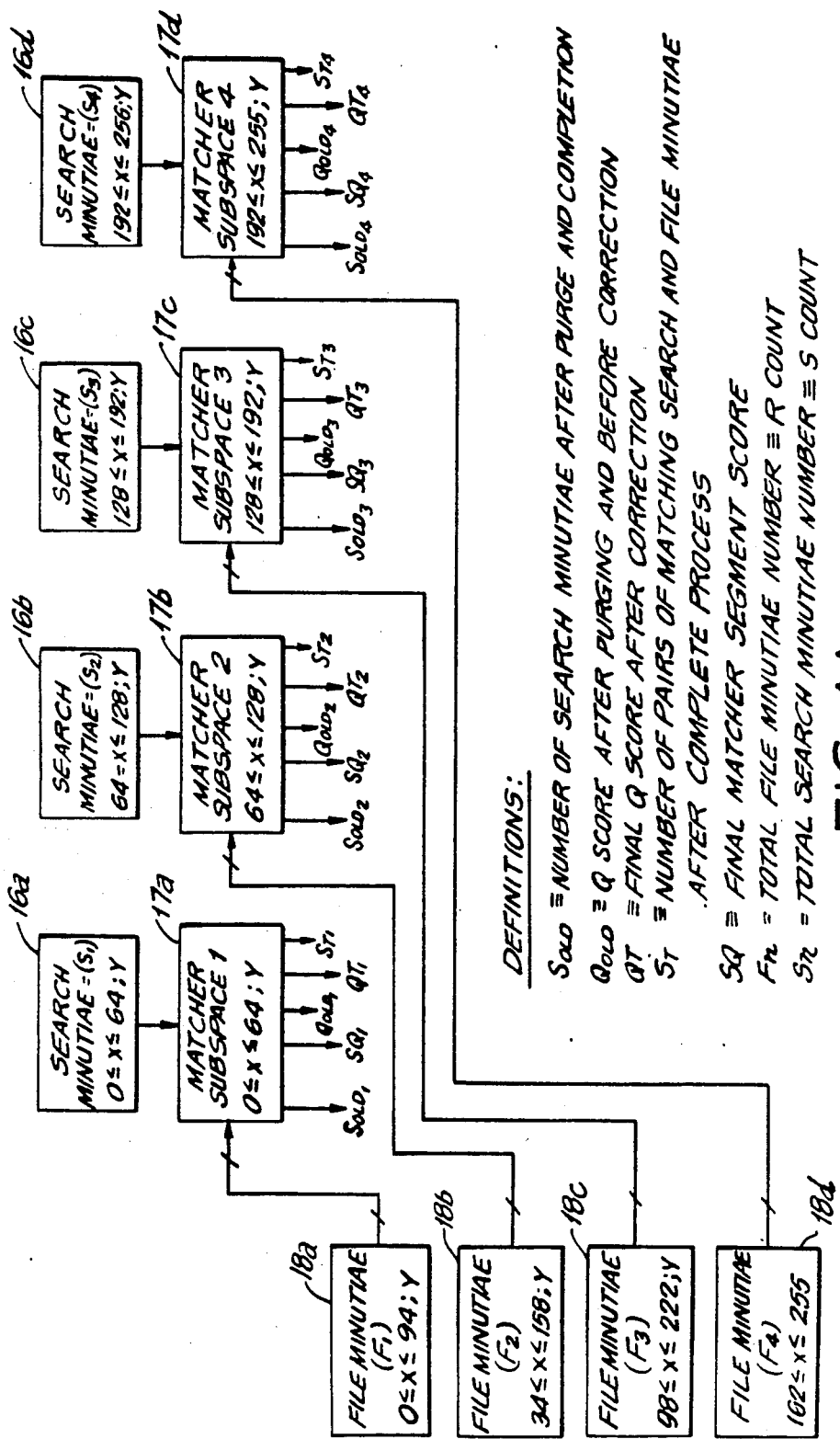

FIG. 4A is a block diagram illustrating the four segment arrangement of this invention wherein the set of File and Search points are divided into four segments to provide four separate parallel stages of comparator and correction processing.

Figure 4B:
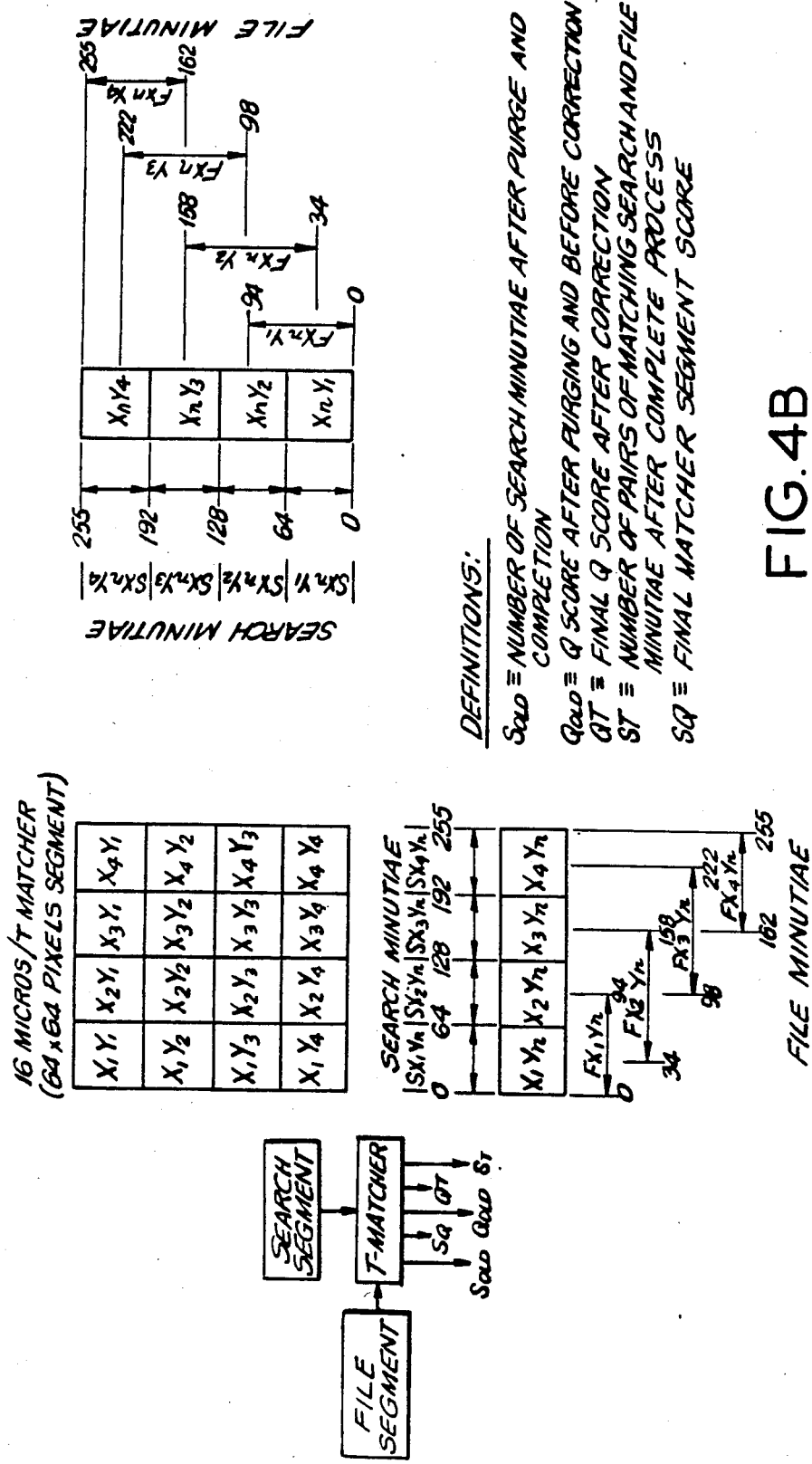

FIG. 4B is a schematic/diagramatic illustration of a sixteen segment arrangement of this invention. FIG. 4B illustrates a two dimensional segmentation and indicates the degree of overlap of the File segments. There is no overlap of the Search segments.

Figure 5A:
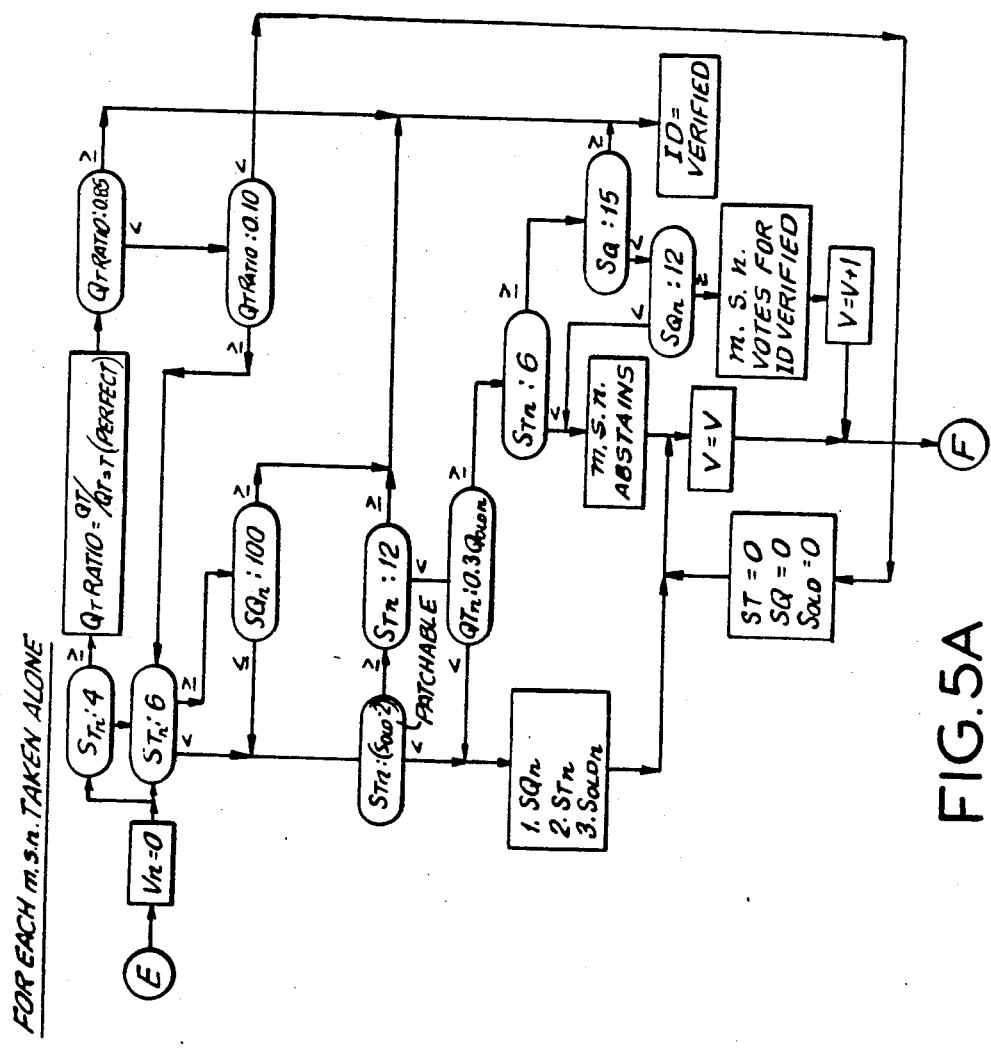
Figure 5B:
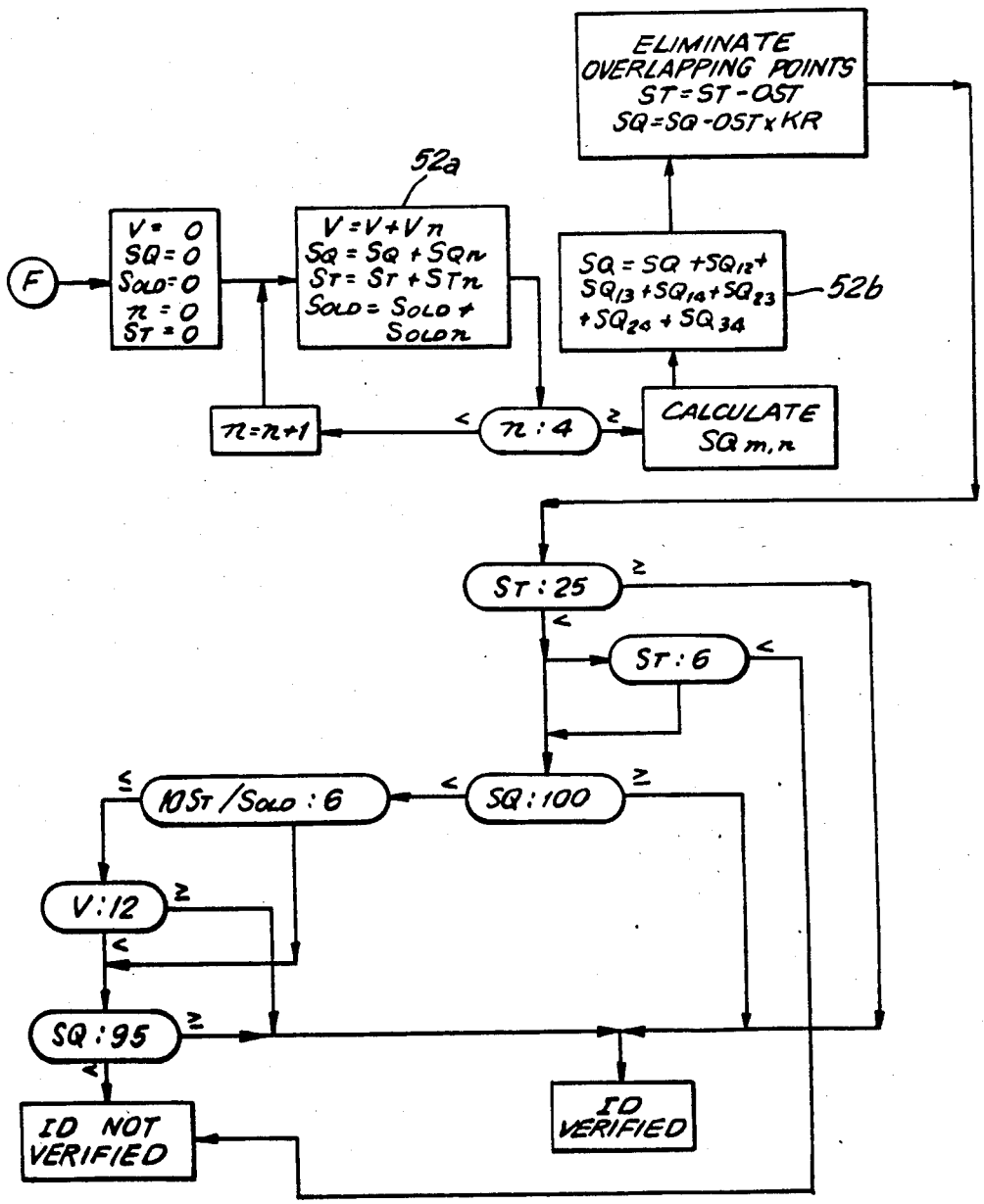

FIGS. 5A and 5B are flow charts indicating scoring techniques which are employed in connection with the FIG. 2 comparator to provide ID verification.

FIG. 5C is a table of the Q values of a perfect match as a function of difference table line entries.

Figure 6A:
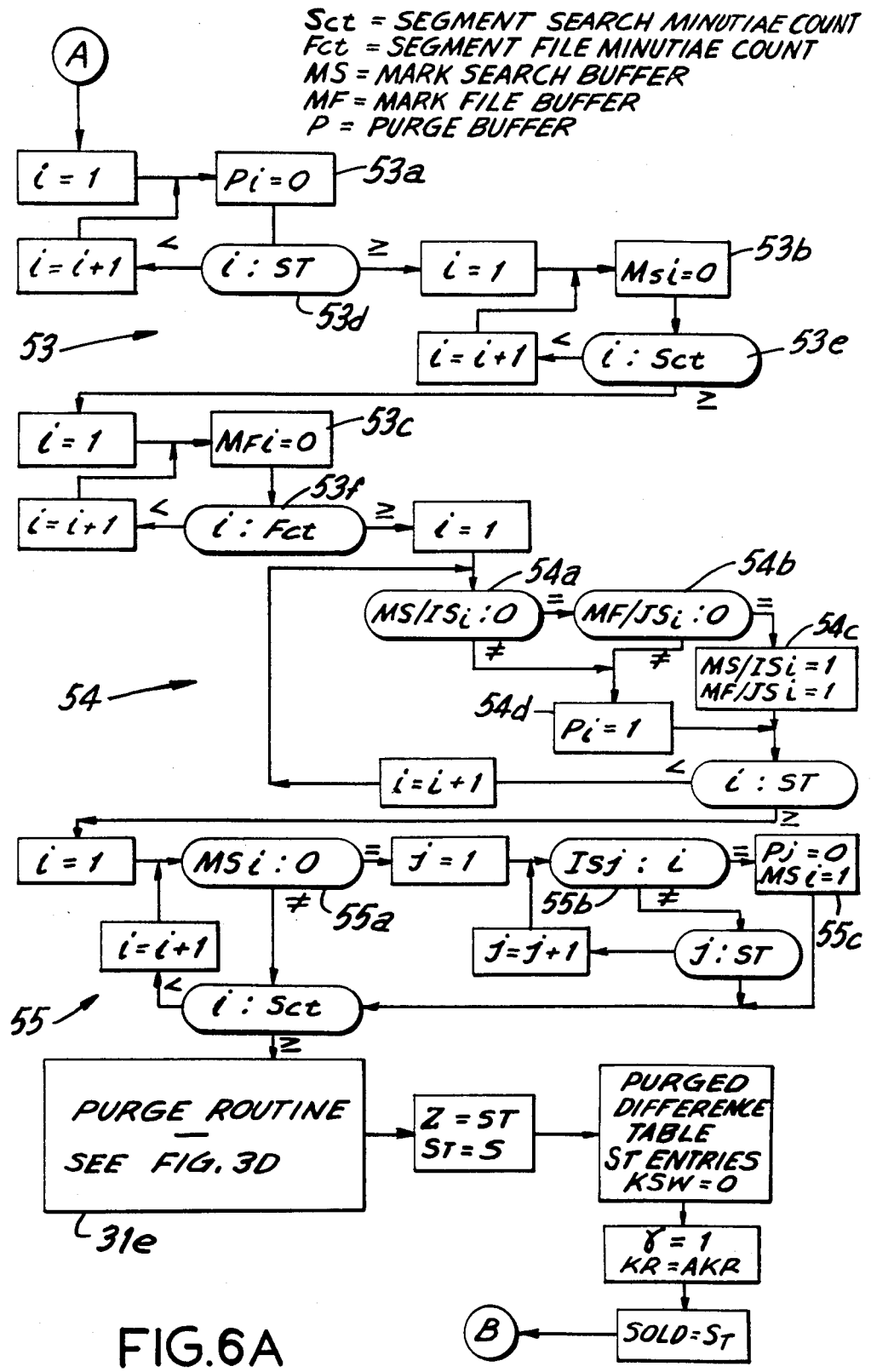
Figure 6B:
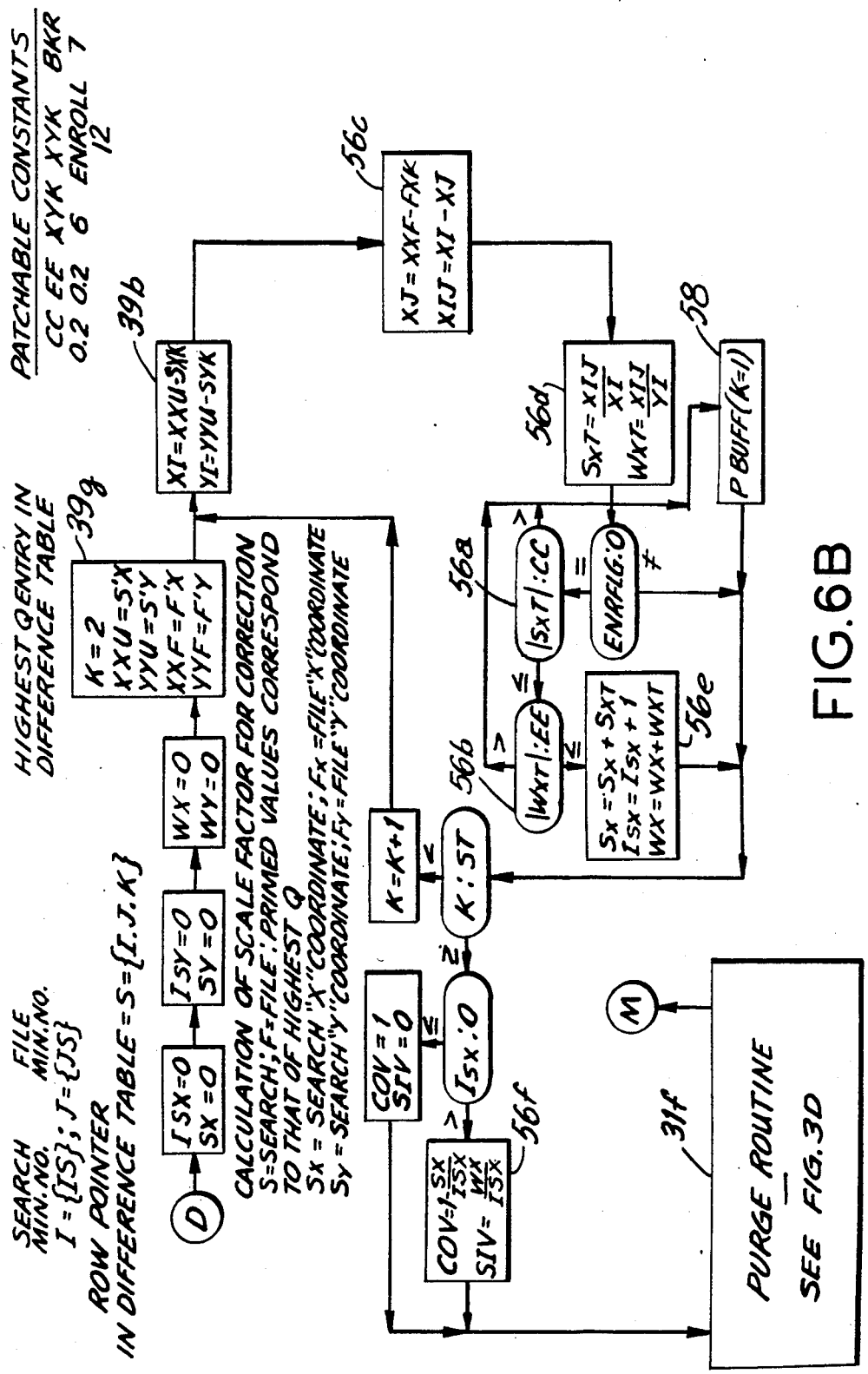
Figure 6C:
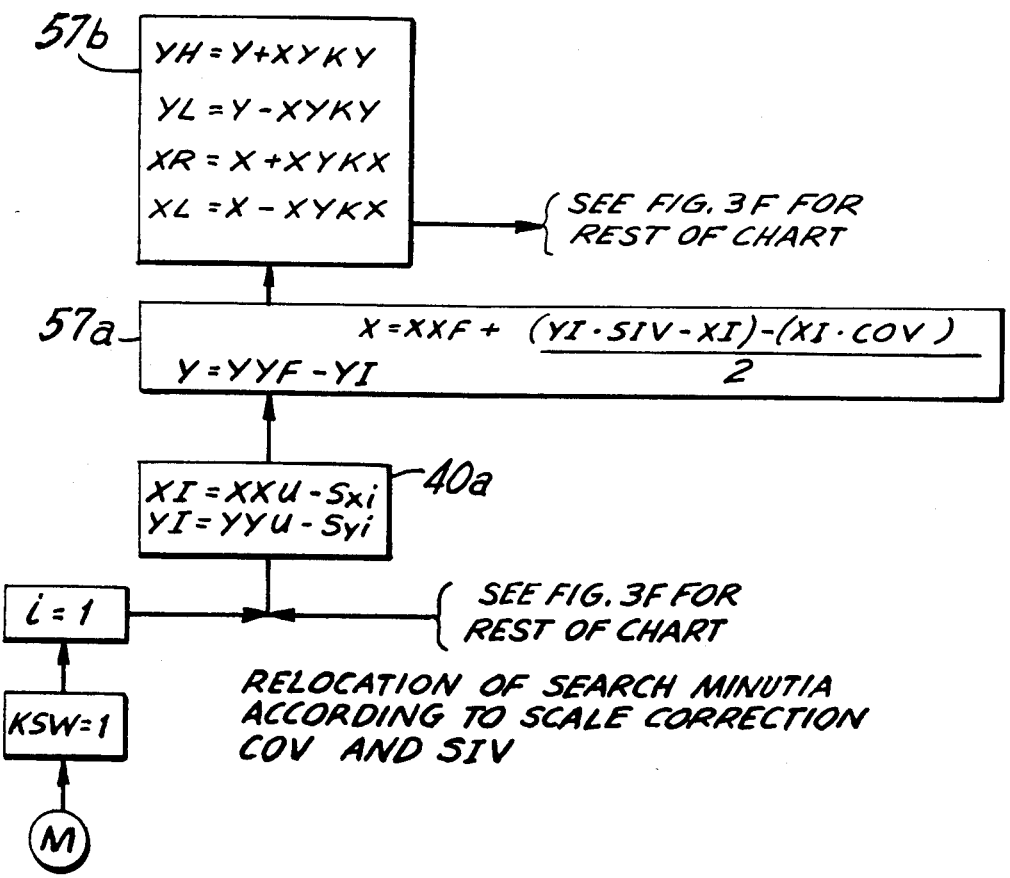

FIGS. 6A through 6C illustrate a variant on the FIG. 3 embodiment in which two primary modifications are made. A first modification is that the FIG. 3D purge of the initial difference table is modified to assure that in the purged difference table there will be one line entry for each Search point IS which appears in the initial difference table. Accordingly, FIG. 6A can be compared with FIG. 3D for an understanding of the changes involved.

The second major distinction in this FIG. 6 embodiment is that the correction for distortion is made only along one axis (in this case the X axis). But the magnitude of the X axis correction takes into account distortions in the Y axis as well as in the X axis. As compared to FIG. 3E, the FIG. 6B shows the additional correction factor SIV. As compared to FIG. 3H, the FIG. 6B shows deletion of the correction factors SIW and COW. FIG. 6C shows the correction of the X values of Search points IS by SIV as well as by COV. There is no Y correction other than the shift in Y indicated at function box 40a.

Figure 8:
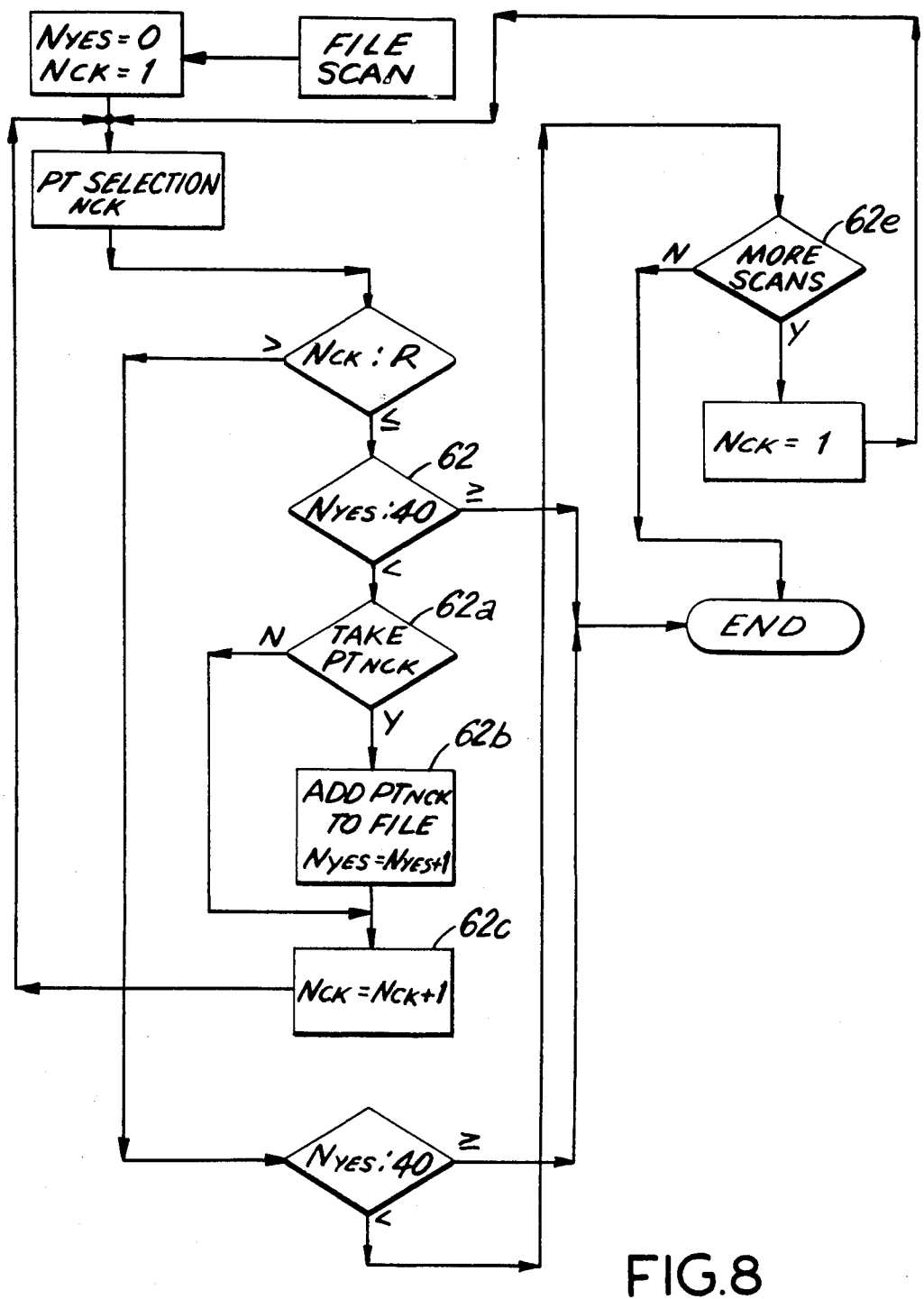

FIGS. 7 and 8 are flow charts illustrating enrollment techniques which are preferred for use in generating the File points to be held in the store 18.

Figure 9:
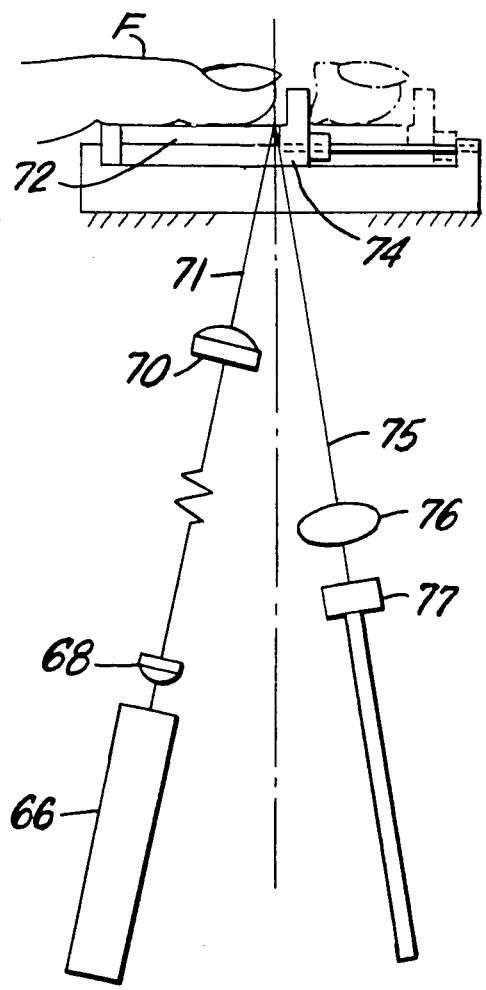
Figure 10:
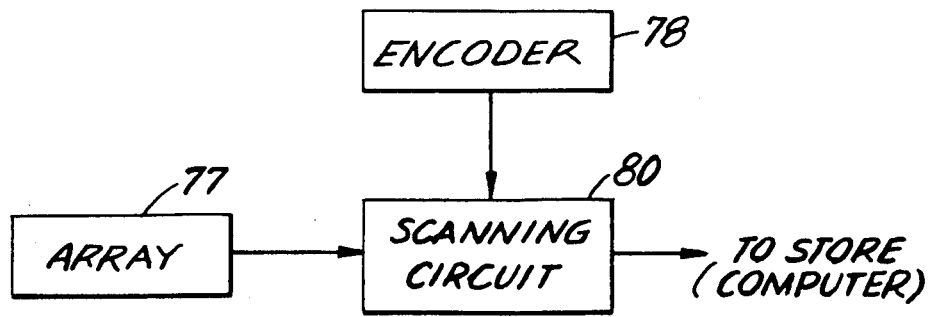

FIGS. 9 and 10 illustrate one known optical scan technique for generating the fingerprint image from which File and Search points are extracted.

DESCRIPTION OF THE PREFERRED EMBODIMENTS

The matcher mechanism provides a score that indicates how well the set of minutia of a subject fingerprint image (the Search points) matches a reference set of minutia (the File points).

A subject fingerprint image may differ from the reference fingerprint image even though both are taken from the same finger of the same individual. Displacement and rotation of the finger causes some of these differences. Differences are also due to the plasticity of the finger which results in some change in the configuration of the minutia points as a function of changes in the amount of force and the direction of the force applied by the individual when placing his or her finger on a platen or other support. The condition of the finger varies from day to day and is a function of recent environment and use. The result is that the set of Search minutia points from a subject image differ from the set of File points in a reference file, even though the two fingerprints are from the same finger.

To provide figures of merit for making a decision on verification, a matching mechanism is used. Each minutia has X and Y coordinates on the image plane. The Matcher of this invention centers around the establishment of a difference table relating to these X and Y image plane position parameters.

The two sets of minutia points to be compared, the File set JS and the Search set IS, may be derived from an image produced by an optical scan of a fingerprint such as that disclosed in U.S. Pat. No. 4,322,163 issued Mar. 30, 1982 and entitled FINGER IDENTIFICATION. The fingerprint image thus provided may be a binary image composed of a number of picture elements (pixels) that permits identification of the standard minutia, specifically the line endings and line bifurcations.

The minutia extracted from such an optical image may be obtained by any of a number of known techniques. Such techniques are described in Stock, R. M., *Automatic Fingerprint Reading Proceedings of the 1972 Carnahan Conference on Electronic Crime Counter-measures*, University of Kentucky, Lexington, Ky., 1972, p. 16-28 and Banner, C. S., and Stock, R. M., *FINDER The FBI's Approach to Automatic Fingerprint Identification, Proceedings of a Conference on the Science of Fingerprints*, Home Office, London, Eng., 1974.

The minutia extracted are stored as a reference record (the File) or as a subject record (the Search points) in memory units of the automatic classification and identification equipment. Each record is a set of points. Each point has X and Y positional coordinates and an angular coordinate. Thus each point is represented by three parameters. The matcher provides a technique for automatically comparing the parameters of the File points with the parameters of Search points.

The matcher mechanism described herein treats each such minutia point as a point and makes no distinction between a line ending minutia point and a bifurcation minutia point. The set of minutia points involved may be extracted from the image by any one of a number of mechanisms. Indeed, the matcher mechanism of this invention does not require that the set of points involved be minutia points. All that is required is that the set of points is deemed to be unique to the fingerprint of the individual involved so that a unique identification may be provided. Accordingly, it should be understood herein with respect to the disclosure and the scope of the claims, that reference to identification points is not necessarily limited to minutia identification points.

The System (FIG. 1)

In broad terms, FIG. 1 illustrates the relationship of the Matcher 10 of this invention to the equipment with which it may be associated. The optical scan mechanism 12, such as that described in the reference Pat. No. 4,322,163 and shown in more detail in FIGS. 9 and 10, provides a binary image. The identification points extraction mechanism 14 extracts from that image a set of points that identify the fingerprint involved. The extraction mechanism 14 may be one of those described in the minutia extraction references identified above. The set of subject points are maintained in a Search point memory store 16 so that they can be compared by the matcher 10 with a set of points in a File point memory store 18. The matcher 10 compares the contents of the two memory units 16 and 18 in the manner described hereinafter to come up with a score which indicates verification. The set of points in the File store 18 may be determined in any fashion. However, for purpose of minimizing both the type I and type II errors, it is preferable that the set of points in the File store 18 be derived from the same mechanism which derives the set of points in the Search store 16.

The File points JS and Search points IS are stored in memory units 16 and 18 by three parameters, namely the X value, Y value and angle value on the image plane. In a preferred embodiment to facilitate comparison, both JS and IS points are stored in Y value order. Thus, $JS_1$ has the lowest Y value of any File point, $JS_2$ has the next Y value, and so forth. By so ordering in terms of Y values, it becomes possible, to include a loop routine to speed up the comparisons between JS and IS points.

An important aspect of the system of this invention is the segmenting of the fingerprint image into a number of separate zones and the application of the comparison techniques and matching techniques to each zone or segment separately. This multiple segment arrangement is described in connection with FIGS. 4A, and 4B. The scoring techniques of FIGS. 5A and 5B use the quality scores from each segment of the matcher. Thus, it should be kept in mind in connection with the disclosure in FIGS. 2 and 3A through 3J that the routines described are replicated for each image segment analyzed.

The Comparator (FIG. 2)

An understanding of the block and function diagram of FIG. 2 will facilitate following and understanding the more detailed flow chart arrangement shown in FIGS. 3A through 3J.

Essentially, as indicated in FIG. 2, the points in the stores 16 and 18 are compared and screened at 20 by a known comparison technique so as to provide the known type of difference table 22. The Qs value for each entry on the difference table is calculated at 24 and then the difference table is rearranged so that it is ordered in sequence by the value of Qs at 26. This means that the first entry in the difference table is the one with the highest Qs value. The routine taken at 28 serves to purge from the difference table all but one entry representing a Search point. That is done by selecting the entry having the highest Qs value for each Search point. A comparable routine is then performed at 30 to purge the difference table of multiple File point entries by retaining only that entry having the highest Qs which represents the File point involved. In this fashion a purged difference table is provided, as indicated at 32. The important thing about this purged difference table, assuming that the Search fingerprint does in fact correspond to the File fingerprint, is that the table represents only the most likely Search point to File point correspondence based on highest Q values. It is believed that this purging of the difference table lays the basis for the substantial improvement in type I errors.

As indicated at 34, this purged difference table is now employed as the difference table for the system and the $Q_s$ values are recalculated based solely on the entries in the purged difference table. The purged difference table is reordered so that the highest Q value is first as indicated at 36.

In the purged reordered difference table the line entry with the highest Q is assumed to represent a corresponding Search and File point. These points are designated herein as S' and F' respectively. A shift procedure is undertaken in which that Search point S' is relocated on the image plane to have the same coordinates as that File point F'. Using that now coincident Search and File point as an origin, a scale factor is calculated, as indicated at 38, for each of the other Search points Sk. The scale factor for each Search point is calculated with respect to the File point with which that Search point is paired to become an entry on the difference table. Any individual Search point scale factor which is greater than a threshold (20% in one embodiment) is eliminated from the calculation. All the individual Search point scale factors thus calculated are averaged to provide a scale factor correction for the set of Search points involved. The set of Search points are only those represented on the purged difference table.

As indicated at 40, the image plane X and Y values for the Search points are shifted to make the Search and File point pair S', F' for the highest Qs entry on the purged difference table coincident. This shift is made by making the DX and DY values for that first entry S', F' on the reordered purged difference table equal to zero. The same shift is made to all the other DX and DY values thereby effectively shifting all of the Search points Sk by the same amount.

As indicated at 42, the Search points are further relocated based on the scale factor. Specifically, after the above shift of positions, the DX and DY values in the reordered purged difference table are corrected by the scale factor. It should be noted that in the simple embodiment of FIGS. 3E and 3F, only the DX values are corrected by the scale factor. The scale factor operates so that the larger the value for DX or DY, the greater will be the magnitude of the relocating correction. Since the value for DX and DY has been set to zero at stage 40 for the difference table entry having the highest Qs, the search point for that highest Qs entry will not be affected by the scale factor correction.

Then the highest fifteen entries from this reordered purged difference table are selected at 44, with their new DX and DY values, to provide the limited difference table indicated at 46. As indicated at 48 a new value for Qs is now calculated based on solely on the up to fifteen difference table entries and their new DX, DY values. With these new Qs values for each of the up to fifteen entries on the new difference table, a total Q value QT is calculated. As indicated at 50, QT and further scoring value SQ is provided as figures of merit used to determine whether or not the Search points match the File points by a scoring routine shown in FIGS. 5A and 5B.

As indicated in the flow charts, the relocation of the Search points by shifting and by scale correction is effected by changing the DX and DY values in the difference table rather than by affecting the image plane position values in the store 18. The number of entries on the limited difference table is limited to fifteen, which are the fifteen entries on the purged difference table that have the highest Qs value. However, these entries on the limited difference table differ from the corresponding entries on the purged difference table because the values of DX and DY have been changed to reflect the corrected and relocated Search point positions. These new values for DX and DY in the limited difference table are used as the basis for calculating the Qc and Qs values for each of the up to fifteen points in the limited difference table.

The correction routine serves to shift and correct the Search points so that when the correct finger is presented for identification, the Search points are repositioned to be more in line with the File points and when the incorrect finger is presented the Search points tend to be shifted more out of line with the File points than they would be without the correction routine. Accordingly, the correction routine of this invention reduces both type I and type II errors.

The Comparator Flow chart (FIGS. 3A Through 3G)

With an understanding of the system presented in FIG. 2 in mind it becomes easier to follow the detailed system set out in FIGS. 3A through 3G.

An initial difference table is created based on a comparison of the set of File points in the store 18 and the set of Search points from the subject image in the store 16. Within certain limits, each File point JS is compared with each Search point IS in establishing the table. No distinction is made between line ending points and bifurcation points. Each minutia is treated as a point. A portion of such a difference table is illustrated in FIG.3B.

For each comparison of a File point JS and a Search point, IS, various entries are made in the table. An entry DX is made equal to the displacement between these two points along the X axis of the image plane. Another entry DY is made equal to the displacement along the Y axis. A third entry may be made indicating the angular difference between the two points. The DX and DY entries are the number of pixels between the two points. A plot of all DX and DY entries creates the difference plane.

The number of entries in the initial difference table (D.T.) is restricted in that for a given File point certain Search points are not included. As indicated in FIG. 3A, in one embodiment, the Search points IS that are excluded from the difference table (D.T.) comparison with a given reference point are where either (i) the Search point is outside of a $61 \times 61$ pixel box centered on the File point; or (ii) where the angle of the Search point is outside of a band of plus or minus 22.5 degrees around the angle for the File point. In the embodiment illustrated, the angle values for each point are used only for this initial screening. They are not otherwise used, although the device of this invention could be extended to use angle information as a further indicator of matching. In this fashion, the number of entries in the initial difference table is limited.

The difference table shown is FIG. 3B is a representation of a portion of a typical difference table. Each entry is given a line number. Each File point JS is compared with each Search point IS which is within the 61×61 pixel box centered on the File point. The X axis and Y axis displacements, DX and DY respectively, are entered in the difference table. The difference table is ordered by the Y value of the reference points. Because of the ordering of the JS and IS points in the memories 16 and 18 it is possible, to include a loop routine which speeds up the comparison. Any Search point IS with a Y value below that of the window set up on a given JS, need not be compared with any subsequent JS points. Thus a determination that the Y value of an IS is below the window means that the next IS point can be immediately reviewed.

FIG. 3B indicates the routine used to calculate the Q value for each entry on the difference table. The Q value for an entry is the value Qs. That value Qs is the sum of individual values Qc. Each individual value Qc is based on a comparison of a given difference table entry with one other difference table entry. A high Qc indicates that the two entries are relatively close to one another on the difference plane. In particular, the two difference plane points are compared by taking the difference between two DX values and adding that to the difference between the two DY values to obtain the TR value, as shown by the equation 24a in FIG. 3B. This TR value is then substracted from a constant KR, which has the value 15 in this embodiment, to come up with the Qc value. As indicated at 24b if (KR−TR) is negative, no Qc contribution is recognized. All of the Qc values for a given entry are summed to provide the Qs value. In the ultimate purged limited difference table which is provided at the operation 46 of FIG. 2, the total value QT for the set of points being compared is also calculated. More particularly:

$$Qs = \Sigma Qc$$

$$QT = \Sigma Qs$$

FIG. 3C shows the routine for ordering the difference table in terms of the Qs values assigned to each entry on the difference table. The ordering routine is a fairly standard routine. One item to note in connection with FIG. 3C, is the two functions 50a and 50b. The function 50a simply means that the output value SQ to the scoring system is zero when there is only one line in the difference table. That is, if ST is equal to or less than "one", then SQ is immediately put out as having the value zero. This will provide an indication to the scoring system of a mismatch and identification will be negatived. The value KSW increments to "one" after the functions performed by the blocks 38 through 44 of FIG. 2 (see 44a in FIG. 3F) are completed. When KSW increments to "one", the value SQ is calculated as indicated by the formula set forth at 50b. But that occurs only after the system processing through block 44 of FIG.2 has been completed.

The output A of FIG. 3C, which is in effect the ordered difference table is purged by the routine shown in FIG. 3D. The purge eliminates all multiple Search difference table entries and all multiple File difference table entries. Where there are such multiple entries, the entry with the highest Qs value is kept. This purging routine is a critically important routine to provide a difference table with a substantial reduction of noise where the Search print and the File print do correspond, thereby substantially reducing the type I error. When the prints do not correspond, the purge reduces the number of random correlations to further improve type II error. The number of entries $S_{old}$ in the purged difference table is retained as a value to be employed in the calculation of the output factor SQ.

The portion of the FIG. 3D that is enclosed in dotted lines and indicated by the reference numeral 31 is a specific purge routine which is repeated at other stages of the processing of the various embodiments described herein. The purge routine 31 portion of the FIG. 3D purge technique is a routine in which a purge buffer P has a single slot for each line entry on the D.T. The purge buffer is initialized to zero. A "zero" status indicates that the corresponding line entry in the D.T. is to be retained. When the status of a P buffer slot is changed to "one", then the purge routine 31 is undertaken to delete that line entry. In the purge routine 31, three indicies are employed. The index "i" indicates the line on the D.T. being examined. The index "c" indicates how many lines are to be purged out. The index "s" indicates where a retained line entry is on the D.T. after purge of one or more other lines. Thus, as indicated at 31m, if a line entry has been given the "one" status in P buffer, the count c of line entries to be eliminated is incremented by one as indicated at 31n and that line entry is placed at the line 256 as indicated at 31p. Placing a line entry at line 256 effectively eliminates that line from the D.T. since the number of lines ST on the D.T. is always substantially fewer than 256 and thus that line will be eliminated at the function box 322. If the line entry being examined is such that the corresponding slot Pi in the P buffer has status "zero" then, as indicated at function box 31m, that line entry is moved up on the D.T. to the line S, which is above the line "i" by the number of lines "c" that are to be deleted at that point in the purging function.

The purge routines 31b, 31c, 31d, 31e and 31f indicated in other FIGS. are identical in function to the routine shown at 31 in FIG. 5D. Those other purge routines operate on D.T. line entries which are deleted for other reasons.

The purged difference table then goes through the Qs calculation procedure of FIG. 3B and then is ordered by the new Qs values as shown in FIG. 3C.

Once the purged difference table has been recycled through the Qs calculation and ordering stages illustrated in FIGS. 3B & 3C, the value of gamma has incremented by one (see 50c in FIG. 3C) and the difference table entries are provided at D as a basis for the calculation of a scale factor COV as indicated in FIG. 3E. As indicated therein, the Search point represented by the highest Qs entry on the purged difference table is deemed to be coincident with the corresponding File point represented by that same entry on the difference table. That is, they are deemed to be coincident on the image plane. With respect to each other entry on the difference table, all other Search points are deemed to be displaced from the corresponding reference point because of distortion. A correction factor is calculated to reflect that distortion. As indicated at 38a in FIG. 3E a separate scale factor component SXT is calculated for each Search point, there being a separate Search point for each entry on the purged difference table. Of course, the scale factor component SXT for the highest Qs entry on the difference table is zero.

It should be noted that in the FIG. 3E embodiment disclosed, a scale factor correction is only made in the X direction and not in the Y direction. FIG. 3H discloses an embodiment where a scale factor correction is made in both directions. Observation shows that in certain types of fingerprint scans the Y distortion is relatively small compared to the X axis distortion and in such cases the FIG. 3E embodiment is sufficient. The scale factor correction SXT for the individual minutia SK, i involved is based on the displacement value XIJ. XIJ is the distance along the X axis between the Search minutia Sk, i and the File minutia Fk, j being compared; that is, $XIJ = XI - XJ$, as indicated at 38e. (FIG. 3J helps to visualize these relations).

The individual scale factor correction SXT is based on the assumption that the highest Q search point S' has been shifted to coincidence with the file point F' with which it is paired as an entry on the difference table. Each other search point Sk is shifted on the image plane the same amount. If the search image does indeed correspond to the file image, then the shift normally moves these other Search points Sk closer to the corresponding File points Fk with which they are paired as an entry in the difference table. To the extent that the other Search points Sk are not coincident with the corresponding File point Fk, that lack of coincidence (for corresponding search and file images) is presumed to be due to plastic distortion in the fingerprint image.

The further the paired points Sk and Fk are from the points S', F', then the greater will be the absolute magnitude of the distortion. Accordingly, the component SXT for the correction factor COV has to be normalized for the distance that Sk is from S'. Thus, the correction factor component SXT is the ratio between (a) the distance XIJ between the two points Sk and Fk being compared and (b) the distance XI that the search point Sk is from the reference point S'. This is shown in function box 38a. The actual correction factor COV, which is shown in box 38b, is the difference between the value "one" (which represents no correction) and the average of the individual correction factor components SXT. The average of the individual correction factors is simply the sum of the individual correction factors SXT (which sum is represented by the symbol SX in FIG. 3E) and the number of search points involved ISX. If the two points being compared Sk and Fk are coincident, the XIJ value is zero and the component SXT for the correction factor COV is zero. The difference between the average correcting factor and the value "one" is the actual correction factor COV that is applied to the X values of those search points on the image plane.

However, as indicated at 38c, if the individual scale factor SXT component exceeds 20% (CC=0.2) then that component is not considered. This has been found to be an important screen to prevent aberrant components from entering into the overall correction factor COV. It prevents over correcting. After all, if the correction does exceed 20%, that tends to indicate the points are not a match and are probably not from the same person.

If an individual scale factor component SXT does fail the CC test at 38c, the corresponding D.T. line entry is deleted. To facilitate understanding of FIG. 3E, that purge routine is not shown. It is exactly the same as the routine 31 shown in FIG. 3D and it would be effected at the output M of FIG. 3E. The position of such a purge routine is shown at 31c of the embodiment of FIG. 3H.

Of lesser importance is the screening factor DD at 38d. If the distance between the Search point under consideration and the Search point of highest Q is less than eight pixels, then the correction component SXT is not calculated. This tends to eliminate over correction due to a noise point, it being unlikely that a good Search point would be that close to the Search point of highest Q.

Once the correction factor COV has been determined, the set of Search points represented by the purged difference table can now be repositioned on the image plane by (a) first translating each Search point by an amount equal to that translation which brings the highest Q Search point coincident with its companion File point and then (b) by relocating Search points based on the scale factor COV.

FIG. 3F illustrates the routine by which the repositioning of each search point Sk occurs. The formulas shown in the function box 40a and 42a achieve the result of both translating the search point and adjusting it in accordance with the scale factor correction COV. An understanding of the function boxes 40a and 42a is facilitated by reference to the sample points on an image plane as shown in FIG. 3J. For the given search point Sk,i the distances X and Y are calculated as indicated in block 40a and as shown in FIG. 3J. (In FIG. 3F the notation XA represents the distances XI referred to in FIGS. 3E and 3J.) Assuming no distortion (which means assuming that the correction factor COV=1), then the location of the point Sk,i on the image plane is based at the distances XI and YI from the file point F'. F' is from the difference table entry having the highest Q. The search point S' is positioned coincident with the file point F'. Thus adding the X and Y values to the X and Y values for the F' point achieves the required shift. By modifying the X value with the scale factor COV, an adjustment is made along the X axis for the distortion. It might be noted that the function box 42a shows the subtraction of the X value from the XXF value. This is only because of the polarity established elsewhere for the calculation of various factors. As long as the polarities are kept, the values being algebraically added to the XXF and YYF point may be expressed either as a subtraction or an addition.

In this FIG. 3E and 3F embodiment the relocation routine based on scale factor COV correction is performed only in the X axis.

The function indicated at 43a, by setting XYK=6, builds a window to eliminate from further processing those difference table entries where the Search point and File point represented by that entry (after the translation and correction) are further apart than six pixels from one another along either axis on the image plane. These D.T. entries from the purged difference table are thus eliminated. And as indicated at 44a this purged difference table with such eliminated points is further limited to no more than fifteen entries. Those fifteen entries are the fifteen that correspond to entries on the purged difference table having the highest Qs values. This provides a limited difference table.

These no more than fifteen D.T. entries are then put through the routine set forth in FIG. 3B of recalculating the Qs values based solely on the relation between these no more than fifteen entries in the limited D.T. However, as indicated at 44c in FIG. 3F, the constant KR has been set at "seven" so that the difference table now to be formed will eliminate all Qc points based on a TR distance (on the difference plane) equal to or greater than "seven".

With the KSW value now having been incremented to one, as indicated at 44a, the output from the FIG. 3B function is applied so as to permit calculation of the SQ value. As shown at 50b in FIG. 3C, the SQ value is essentially the sum of the Qs values from the limited difference table (QT), times the number of entries on that table (ST), divided by the number of entries in the purged difference table ($S_{old}$). The value KRR is to normalize the value of QT since each Qc is a double contribution and the multiplication of QT by 0.5 normalizes the result. It should be noted that the value for ST cannot be greater than fifteen whereas the value of the denominator $S_{old}$ will normally be greater than St.

The minutia point comparison mechanism importantly includes the combination of (a) the purge of the difference table so as to limit it to only the more likely Search and File point comparisons and (b) the technique of shifting and correcting the effective position of the Search points on the image plane before calculating the proximity values which are used to determine whether or not a match has been made. This combination tends to result in a very significant improvement over other matcher designs in type I error. But it also improves type II error. Thus, the features of this matcher design have the advantage of moving the trade off between the different types of errors and the speed of operation to an improved level because the nature of the mechanism improves both types of errors.

Two Axis Scale Factor Correction (FIG. 3H through 3J)

In some implementations of this invention, it is desirable to correct the scale factor along the Y axis as well as along the X axis. The application of the matcher to matching a set of Search points derived from an inked fingerprint, for example, against a set of File points involves a situation where it may be desirable to provide scale factor correction along both axes. FIGS. 3H and 3I are comparable to FIGS. 3E and 3F except that FIGS. 3H and 3I illustrate the steps required to provide scale factor correction along two axes. Accordingly, where the functions are essentially the same, the same reference numerals are used in FIGS. 3H and 3I as are used in FIGS. 3E and 3F. However, some of the description is repeated herein to facilitate an understanding of this two axis correction.

Observation shows that with respect to any given Search point IS, distortion is usually greater along one of the two axis. Which axis has the greater distortion is a function of the particular finger impression from which the set of Search points are derived. Which of the two axes X or Y has the greater distortion is determined at the decision box 39a comparing the absolute values of the displacement XI and YI. This decision is made with respect to each of the Search points. For a given set of Search points, most will tend to have the same dominant distortion directional tendency.

As shown at the box 39b in FIG. 3H, the distance XI is a distance on the image plane between (a) the X value of the search point S' that is a member of the pair having the highest Q in the difference table and (b) the X value of the search point Sk being evaluated. These two distances are respectively the distances XXU and SXK. The Y axis distance YI is completely analogous.

As indicated at the decision boxes 38d and 39d, if the absolute value of either XI or YI is less than a predetermined value DD (which is eight pixels in the embodiment shown) then the Search point involved does not contribute to the scale factor correction and, as indicated at 39e, the process increments by one and the next Search point IS is selected for this scale factor correction determination. The reason for this is that if a Search point is that close to S' its position is unlikely to be significantly distorted relative to S' and thus need not be incorporated in calculating a value for the scale factor correction.

The initial parameters for the scale factor correction calculation shown in FIG. 3H are as indicated in the block 39g and the blocks upstream from 39g. In particular, the X and Y values on the image plane for the Search point S' and file point F' (the points associated with the highest Q entry on the difference table) are those values XXU, YYU, XXF and YYF indicated in 39g. The value for K is initially set as "2" because K=1 represents the first line on the difference table (which line derives from the comparison of the Search point S' and File point F'). This line on the difference table is not compared to itself. It is the line against which the other lines in the difference table are compared. Then, for each search point Sk on the difference table, from line K=2 through the difference table, the rest of the routine shown in FIG. 3H is undertaken so as to come up with the output scale factor corrections COV, COW, CIV, SIW.

To facilitate visualizing certain of these values and relationships and in particular those illustrated in connection with FIG. 3H, there is provided in FIG. 3J an example on the image plane of the Search point S' and File point F' from the top line in the difference table and an example of one other Search poink Sk and File point Fk from some other line on the difference table.

Providing that the Search point Sk is outside the eight pixel proximity criteria of function boxes 38d and 39d, the values shown in function box 39f are provided to permit calculating the scale factor components as shown in either function box 39m or 39n. Which of these scale factor components are calculated is determined by the comparison shown in decision box 39a.

Assume that scale factor components SXT and WYT have been calculated as shown in function box 39n. Then as indicated at 39p and 39q, if either of these components SXT or WYT exceeds twenty per cent, neither component is further considered. Indeed, a signal is sent to the purge buffer 58 to cause the Search point involved be deleted from the difference table. It is for this reason that the purge routine 31c is included.

The decision box 39r is significant only during enrollment. It is an enrollment flag. During the enrollment procedure described hereinafter the deletion routine provided by the buffer 45 is not undertaken. But for immediate purposes this enrollment flag 39r can be ignored.

Assuming that these individual scale factor components SXT and WYT pass by the decision boxes 39p and 39q, they are summed as indicated by the function box 39s and the average sum is used to calculate the correction values COV and SIW as indicated at function box 39t.

Where the decision box 39a indicates that the absolute value of YI is greater than the absolute value of XI, the calculations shown at function boxes 39m and 39u are undertaken to provide summed values for calculation of the scale factor correction values COW and SIV as shown in function box 39w.

As indicated by the two decision boxes 39x, when there are no scale factor components in either the 39m or 39n branch of this procedure, the appropriate correcting scale factors COV, SIW, COW, SIV are set to values of one and zero as appropriate and as indicated in the two function boxes 39y.

FIG. 3I is quite similar to FIG. 3F. The shift at operator box 40a is the same. The relocation based on scale factor correction is, as indicated at boxes 42b, 42c performed in both the X and Y axis. The decision box 42d determines whether the scale factor corrections to be applied are the COV/SIW pair where X axis distortion is greater than or equal to Y axis distortions, or the SIV/COW pair where Y distortion is greater than X axis distortion.

Otherwise the six pixel window at 43a, the limitations of the D.T. to fifteen entries at 44a and the limiting of the TR distance to seven (effected by setting KR=7) as indicated at 44c are the same as in FIG. 3F. The purge routine 31d is to eliminate those line entries where the File point Fi is outside the 43a window around the corresponding Search point Si.

The FIG. 6 Embodiment

FIG. 6A, 6B and 6C illustrate a variation on the embodiment illustrated in FIGS. 3A through 3F. This is a presently preferred embodiment which appears to provide some enhancement over the FIG. 3A-3F embodiment. FIGS. 6A, 6B and 6C correspond to FIGS. 3D, 3E and 3F, respectively. Accordingly, it should be understood that the disclosure relative to FIGS. 3A, 3B, 3C and 3G substantially apply to this FIG. 6 embodiment except for a couple of details mentioned below.

The first detail relates to FIG. 3B. In the FIG. 6 embodiment, KR is set at the value of 7. When this is done, it has been found unnecessary to include the decision box TR:KHR.

FIG. 6A illustrates a presently preferred purge technique for the difference table (D.T.). This technique differs from the technique illustrated in FIG. 3D primarily in that the FIG. 6A purge incorporates what is in effect an "add-back" feature that takes into account the fact that the purge of all multiple File and multiple Search points (the IS and JS points) may result in a purged D.T. having no entry for certain Search points that are represented in the initial D.T. It has been found to enhance accuracy to include an entry in the purged difference table for each IS point that is incorporated in the initial D.T. Accordingly, after the Search and File purge routines have been followed, it is desirable to add back the highest Q score D.T. entry for any IS point that is not represented in the raw purge of all multiple IS and JS points. The result is a difference table having a net purge such that there are no more line entries than Search points and no more than one line entry for each Search point. There may be fewer line entries than Search points because of the initial qualification routine so that any Search points which are not represented in the initial difference table are not represented in the purged difference table.

The approach illustrated by FIG. 6A is one that requires the maintenance of three buffers. A first buffer MS is referred to as a mark search buffer. The MS buffer has a slot for each IS point that is a member of an entry on the initial D.T. The slot in the MS buffer is used to indicate whether or not that IS point is retained as a member of some entry on the purged D.T. after the raw purge.

At the start of the purge routine, this MS buffer has a "zero" designation for each IS point. The "zero" designation means that the IS point is not represented in the purged D.T. As the purge routine goes along and line entries are determined to be retained in the D.T., the MS buffer entry for the corresponding IS point is changed to the designation "one" indicating that the IS point is to be represented in the purged D.T. by one of the entries from the initial D.T.

The mark file buffer MF has exactly the same structure and performs exactly the same function for each of the file points JS.

As the purge routine is undertaken and the indications build up in the MS buffer and MF buffer as to which IS and JS points are to be represented in the purged D.T., an array of information is provided that permits a routine of determining which IS points are not represented after the purge routine has been completed. Then an appropriate line entry from the original D.T. can be selected so as to include a representation of each IS point in the purged D.T.

The third buffer P is called a purge buffer. It has a slot for each line entry on the initial D.T. The P buffer simply contains an indication as to whether or not the corresponding line entry on the D.T. is to be retained or eliminated from the purged D.T.

A "zero" designation in a P buffer slot means that the corresponding line in the initial ordered D.T. is to be retained in the purged D.T. The designation "one" in the P buffer slot means the corresponding line in the initial ordered D.T. is to be eliminated from the purged D.T. The use of the "zero" and "one" status designations in the P buffer thus differ from the use of those status designations in the MS and MF buffers for reasons that have to do with the advantage of initializing all slots in each of the three buffers to zero.

With reference to FIG. 6A, the operations at 53a, 53b and 53c all indicate initializing the three buffers involved to a zero status in each slot of each buffer. As indicated at 53d, the number of slots in the P buffer is equal to the number of lines (St) in the initial D.T. As indicated at 53e, the number of slots in the MS buffer is equal to the number Sct of Search points and as indicated at 51f the number of slots in the MF buffer is equal to the number Fct of File points.

The routine generally shown at 54 in FIG. 6A illustrates the raw purge routine. Each of the "St" line entries in the initial ordered D.T. are compared at 54a with the status indicated for that IS point in the MS buffer. The line entries are so processed in order of Qs value. If that IS slot is zero, then that D.T. entry is compared, as indicated at 54b, with the status of the JS point in the MF buffer. If that status is also zero, then as indicated by the function box 54c, the status of the IS point and JS point in that line entry is changed to "one" in the MS and MF buffers respectively. This routine is repeated for each of the entries on the initial ordered D.T. If for any one of these entries it turns out that either the IS point or the JS point has already been given the status "one" in either the MS or MF buffer, then, as indicated at 54d, the slot in the P buffer which corresponds to that D.T. line has its status changed from "zero" to "one".

Thus, at the completion of the routine indicated at 54, the P buffer will hold a designation "zero" for a set of D.T. line entries in which there are no duplicate IS points and no duplicate JS points. The P buffer will designate all other D.T. line entries as "one".

The routine shown at 55 adds into the P buffer a "zero" status (a retain designation) for D.T. line entries having an IS member which is not represented after the raw purge indicated by the routine at 54. As indicated at 55a, each MS buffer slot with the status "zero" (meaning that IS is not represented after the raw purge at 54) is identified. Then, as indicated at 55b, each D.T. entry by Qs order is compared to identify a D.T. entry having the IS missing from the MS buffer as a member. As indicated at 55c, the P buffer slot corresponding to the identified D.T. entry has its status changed to "zero" and the slot in the MS buffer designating the IS member of that line entry has its status changed to "one". In this fashion, the P buffer is caused to designate at least one, but no more than one, line entry from the initial D.T. having each IS member in the initial D.T. Because the FIG. 6A purge routine operates on an initial D.T. ordered by proximity valve Qs, the highest Qs for each IS is the line on the purged D.T.

The purge routine 31e like comparable routines shown in FIGS. 3D, 3E, 3F, 3H and 3I provides for the actual purge of all line entries where the P buffer has the status "one".

FIG. 6B can be understood as adding the CIV correction factor to the FIG. 3E routine or as deleting the COW and SIW correction factor routines from the FIG. 3H arrangement. Essentially, the SXT value from each Search point IS is calculated as in FIG. 3E and the correction factor COV calculated from the average SXT after eliminating those SXT values which exceed 0.2, as indicated at 56a. Note that in FIG. 6B, the criteria shown at 38d in FIG. 3E is not employed and thus those Search points having relatively small XI values are used in the FIG. 6 embodiment.

Similarly, the WXT values and corresponding SIV correction, as shown in FIG. 3H, are calculated in the FIG. 6B embodiment. Again note that the DD closeness criterion (at 38d and 39d of FIG. 3H) is not employed in FIG. 6B. But the window created by the EE=0.2 criteria is retained (see 56b).

The FIG. 6B arrangement can be thought of as taking the X-axis distance between Sk and Fk (see FIG. 3J), which X-axis distance is XIJ (i.e., XI–XJ) as shown at 56c and normalizing that presumed error for both X and Y distortion. Thus, dividing the "error" XIJ by the X distance (XI) between S' and Sk normalizes XIJ for distortion along the X-axis (see 56d). And dividing XIJ by the Y distance (YI) between S' and Sk normalizes XIJ for Y-axis distortion. As shown at 56e, , the SXT values are summed and the WXT values are summed. The average values are used to provide COV and SIV as shown at 56f. The result is that COV and SIV both provide a measure of X-axis "error" between Sk and Fk.

The purge routine 31f in FIG. 6B is undertaken to eliminate from the D.T., those line entries which result in a correction factor component SXT or WXT greater than 20 percent. As indicated at 56a and 56b, if either of those components is greater than 0.2, then the purge buffer 58 has its slot that corresponds to that line entry given the status "one". The purge routine 31f operates exactly as does the purge routine 31 in FIG. 3D to eliminate that line entry and to bring all line entries that are below the eliminated line entry up one line each.

The shift correction shown in FIG. 6C at 40a is the same as in the FIG. 3F embodiment.

But, as shown at box 57a, the correction in the X value of Si takes into account both COV and SIV factors. In order to avoid overcorrecting, the value of the correction due to each factor is divided by two.

As indicated at 57b, a window is created around the shifted and corrected Si point. This window is created on the image plane. The window extends 5 pixels in both directions along the X-axis from the Si point and 20 pixels in both directions along the Y-axis from the Si point. If the corresponding file point Fi falls outside that window, then the corresponding line entry is dropped from the difference table by the technique shown in FIG. 3F.

The Multiple Segment System (FIGS. 4A and 4B)

The distortions and changes in the nature of the finger image presented from time to time are in part compensated for by the system described above in connection with FIGS. 2 and 3. However, in one preferred application of the above system, the fingerprint or finger image is divided into four segments. These are four vertical segments.

In one type of scan, most of the distortion occurs along the X axis. Thus in that embodiment the X axis is divided into four segments and the zone associated with a segment extends along the entire Y axis. As indicated in FIG. 4A, this means four separate File minutia point stores 18a through 18d and four Search point stores 16a through 16d. As indicated in the corresponding units in FIG. 4A, the points stored in the various File minutia stores 18a through 18d overlap appreciably. Specifically, the overlap is by sixty pixels so that the first File points store 18a covers the File image points from X=0 to X=94 while the next File point store 18b covers the File points having X values from X=34 through X=158. However, the Search point stores do not overlap. As indicated in FIG. 4A, each Search segment is compared against a corresponding File segment in a separate comparator 17a through 17d, which comparator is essentially the device illustrated in FIGS. 2 and 3. Specifically all of the units shown in FIG. 2 from the compare and screen unit 20 through the calculate unit 50 are replicated for each of these four comparators 17a through 17d.

As indicated in FIG. 4A, each of the FIG. 2 units 17a through 17d provide five items of output data as indicated and defined in FIG. 4A. It is this output data which is processed by the scoring system of FIGS. 5A and 5B to provide verification of identification.

The four segments illustrated in FIG. 4A are vertical segments which break the image up along the X axis into four zones which overlap along the X axis. Because of the overlap, each segment covers somewhat more than one third of the image.

FIG. 4B illustrates an extension of the FIG. 4A arrangement to a sixteen sub-space system in which the image is divided into a set of four by four segments. The comments made above with respect to the FIG. 4A embodiment substantially apply to this FIG. 4B embodiment except there are now sixteen comparators 17 employed in the FIG. 4B embodiment. There are, accordingly, sixteen sets of output data, one set from each comparator and thus one set representing each of the sixteen sub-spaces. This output data is processed by the scoring system of FIGS. 5A and 5B to provide verification of identification.

In an access system, speed of verification is important and the multiple matching arrangement described therein proceeds in parallel. Furthermore, in an access system, it is relatively hard to control the alignment of the set of Search points and thus a substantial overlapping of the segments, is required. By contrast, in a fingerprint identification system where, for example, a fingerprint card provides the set of Search points that are to be compared with the set of File points, somewhat greater flexibility with respect to time is possible and much greater control over alignment may be provided. Accordingly, in such a system, the amount of overlap between the multiple segments may be appreciably less or if alignment is adequately controlled, there need be no overlap.

What is important to overcome the errors introduced by the inevitable differences between the Search image and the File image is the segmenting of the field and the use of a scale factor particular to each field within that field. It is that combination which provides the power of this system to provide the combination of low type I and low type II errors.

More particularly, the separate, simple linear scale factor calculated for each segment makes it easier to identify a cluster out of a noisy environment. The distortion and the noise that may exist in a fingerprint file tends to make it difficult to identify a cluster. However, as a smaller segment is considered, the ability of the simple scale factor correction to compensate for the distortion reduces the masking of the cluster. Thus the segmentation is particularly useful to aid in identifying a fingerprint in a noisy environment.

An important aspect of the system of this invention is the segmenting of the fingerprint image into a number of separate zones and the application of the comparison techniques and matching techniques to each zone or segment separately. This multiple segment arrangement is described in connection with FIGS. 4A and 4B. The scoring techniques illustrated in FIGS. 5A, 5B, and 5C are scoring techniques which use the quality scores from each segment of the matcher. Thus, it should be kept in mind in connection with the disclosure in FIGS. 2 and 3A through 3J that the routines described are replicated for each image segment analyzed.

I.D. Verified—FIGS. 5A and 5B

FIG. 5A is a flow chart of the operation of one of four scoring units. Each of the scoring units are coupled to separate outputs from the four separate comparator segment units 17a through 17d. Thus the particulars of the following identification technique is based on the four segment embodiment of FIG. 4A. If any one of the four sets of ouput parameters meets the verification critera set forth in FIG. 5A then identification is verified. This is a quick procedure when there is a high degree of correlation between the Search points and File points in any one of the four segments and avoids going through the FIG. 5B routine.

Specifically, if the number of lines ST in the final limited difference table is four or more, and the QT ratio is equal to or greater than 0.85, then I.D. is deemed verified. The QT ratio is the ratio between QT and what QT would be if there were a perfect match between the Search and File points in the limited set coming out of the process of FIG. 3F. As shown in FIG. 5C for example, if ST=4 (that is, there are only four entries in the difference table) then QT=42 for a perfect match. Note that at the end of FIG. 3F processing, KR=7 so that $Q_c$ can be no greater than "seven". Thus on perfect match, raw QT=84 and 0.5 x raw QT="42". FIG. 5 shows the QT values for other perfect match situations for other size difference tables.

As shown in FIG. 5A there are a number of other identification paths involving others of the five parameter outputs which permit identification to be verified and those paths are self evident from FIG. 5A. What is important to recognize is that there are two main outputs other than identification being verified. One of the outputs involves applying the value "one" to the "vote" parameter V if the correlation between Search points and File points is less than sufficient to provide a verification of I.D. but is greater than certain critera set forth in FIG. 5A. However, if those critera are not met, the output from FIG. 5A is in effect a value for V equal to "zero".

Thus if identification is not verified under one of the paths of FIG. 5A, an output from the FIG. 5A unit (being the value V equal either to "one or "zero") is applied to the FIG. 5B unit.

The inputs to FIG. 5B are the outputs from each of the four FIG. 5A units presuming that the I.D. has not been identified in any one of those four FIG. 5A units. As shown by the loop that includes the operating box 52a, the values of V as well as the other output values from the FIG. 2 units are summed for the four fingerprint segments (n=1 through n=4).

If the sum of the ST values (total number of lines in the limited difference table from the four comparator units combined) is equal to or greater than "25" then identification is verified and if that summed ST value is less than six, then identification is specifically not verified. However, as indicated, there is another path for verification if ST is between six and twenty-five and the SQ sum is greater than one hundred, then identification is verified. And, as indicated in FIG. 5B there are two other paths to verification of identification.

As indicated by the operating box 52b, a combined final matcher segment score SQ is calculated that takes into account not just the individual matcher segment scores $SQ_n$ but also the mutual matcher segment scores $SQ_{m,n}$ determined by the relationships between the four matcher segments taken two at a time. The calculation of the individual matcher segment quality score $SQ_n$ is shown at the operating box 50b in FIG. 3C. However, as indicated at operating box 52b in FIG. 5B, the combined quality score SQ from the various segments of the matcher is calculated in a fashion that takes into account not only the quality score for each segment $SQ_n$, but also the relationships between the quality scores of each segment. These relationships $SQ_{m,n}$ (that is, $SQ_{12}, SQ_{13}, SQ_{14}, SQ_{23}$ and $SQ_{34}$) are based on the QT ratios (see box 51a in FIG. 5A) and the ST values (see FIG. 4A).

As may be seen from considering the limit situation, the $SQ_{m,n}$ value between any two segments if added to the SQ value for each of the two segments being compared equals the SQ value for the two segments combined and considered as one segment. In the $SQ_{m,n}$ formula, the product of the two ST values provides the factor to represent the additional pairing that would be possible if the two segments were considered as a single segment.

For example, assuming a perfect match and thus with specific reference to the FIG. 5C table, if one assumes that segment "m" has five lines in the difference table (that is ST=5) and that segment "n" has six lines in the difference table, it will be seen that the possible pairing of these two segments taken separately will be ten and fifteen respectfully for a total of twenty-five pairings. However, if these two segments were taken as a unit for a total of eleven lines in the difference table, then the possible pairings among these eleven lines would be fifty-five. If one multiplies the two ST values, the result is 5×6=30. If that value of "30" is added to the "25", the result is "55". In this fashion, the product of ST for segment m and ST for segment n provides an appropriate factor that exactly makes up for what is lost by segmenting where there is a perfect match. Where there is less than a perfect match, the two proximity value ratios (QT ratio) provide the appropriate down grading of the $SQ_{m,n}$ contribution.

In law enforcement work, the identification procedures of FIGS. 5A and 5B may not be required. It might only be necessary to rank a series of quality scores SQ (as calculated in box 52b) so that the Files for the top predetermined few are pulled for further investigation. In such a situation, the Search record is compared against each of a predetermined number of Files, selected for some fingerprint type category, and those having the largest SQ values selected. In such an application, the I.D. thresholds shown in FIGS. 5A and 5B would not be employed.

Enrollment (FIGS. 7 and 8)

The value of the Matcher is greatly enhanced by having an appropriate and effective enrollment procedure so that the File points include a reasonably good number of repeatable classical minutia. Accordingly, the enrollment techniques shown in FIGS. 7 and 8 are of appreciable importance. Although the automatic enrollment scan technique of FIG. 7 will normally provide a good usable enrollment File, the manual enrollment technique of FIG. 8 can be employed when it is desired to generate the enrollment File on the basis of an enrollment officer visually picking out points to provide the enrollment File.

One of the useful points of this matcher arrangement is that once a good File of repeatable classical minutia is provided, identification will be had even though there are other points in the File. That is, the purging and shifting techniques will provide a final difference table which has eliminated File entries due to noise so that a proper identification can be made. This permits a variety of enrollment and verification techniques to be employed. For example, three fingers of an individual can be enrolled in the same file with ten points from each finger. It will then be possible for the individual involved to be identified if any one of the three fingers are presented to provide the Search points.

Another example is that an individual with very few (e.g. four) repeating classical minutia can have the same finger enrolled three separate times to provide twelve File points. This would enormously reduce the risk of type I error for that individual even though there are only a few Search points on which to provide verification.

A third example is the possiblity of enrolling a finger from two different individuals in the same File. Access would be had in a high security situation only if the Search file contains the minutia points from the two individuals presenting their respective fingers at the same time.

The basic automatic enrollment procedure, as indicated by the flow chart of FIG. 7 is to provide a first or initial enrollment scan (N=1) which forms a reference file. The finger being enrolled is removed and replaced in position for scanning six subsequent times (scans N=2 through N=7) during each of these scans two through seven, the extracted points are compared with the points in the initial (N=1) enrollment scan. If a comparison is found, that point in the initial enrollment scan is tagged as having been verified. The number of scans which verifiy each point in the initial enrollment scan determine an "N" value for that point. As indicated at 60c, a reduced enrollment file is created limited to those points in the initial enrollment file which are verified at least four times; i.e. N=4 or more.

The comparison technique involved substantially replicates the technique shown in FIGS. 2 and 3 except that no correction factor COV is involved. More specifically, as may be seen from FIG. 3E, if the value CC is set equal to "zero", then the value for COV will automatically equal "one". That is done during these enrollment scans. In addition, the window or box which limits or screens the range within which a comparison of points can be made is essentially set equal to 25 pixels by 25 pixels. This is done by setting the XYK value, indicated in FIG. 3, as being equal to "12". A point in the initial enrollment file is deemed to be matched in any one of the subsequent enrollment scans only if that initial enrollment file point appears in the limited difference table developed from the output of FIG. 3F. Because no ID verification is involved, the subsequent calculation of values such as $Q_t$ need not be undertaken. However, processing in enrollment does replicate the processing in verification up to the point where ID verification steps are required.

As then shown in FIG. 7, the limited file formed at 60c becomes the basic file which three additional scans of the finger being enrolled are made. These three additional scans can provide additional verification for each point in the enrollment file. As indicated at 60d. The enrollment file points are ranked in order by the number of verifications "N" involved and only those points having at least eight verification indications (N=8 or more) are retained. As a further constraint, a maximum output file of 30 points is established based on those points having the highest number of verifications.

Because of the overlap between the File points in the four segments (see the files 18a through 18d in FIG. 4A) it is possible for certain initial scan points to be verified more than once in a scan. Thus the criteria at 60c and 60d contemplate and take into account "N" being greater than "six" and "nine" respectively.

Manual Enrollment

As shown in FIG. 8, a technique of manual enrollment can be employed where the enrolling officer has the expertise and know how to make a selection based on visual examination that permits the creation of a set of File points on one or two finger scans. This can be quicker than automatic enrollment and sometimes provides a better file than does automatic enrollment.

As shown in FIG. 8, a single scan is taken and the extracted points are presented to the enrollment officer who goes through a point by point procedure of selecting or rejecting the extracted points. If the enrollment officer selects forty or more points, the enrollment procedure is ended and those forty or more points become the File. If the enrollment officer picks fewer than forty points, the enrollment officer can execute an additional scan to provide an additional set of points for review.

More particularly, the extracted points R are presented to the enrollment officer automatically on a one to one basis on the image. A first counter $N_{ck}$ provides an indication of how many points have been reviewed by the enrollment officer and a second counter $N_{yes}$ provides an indication of how many of these points have been selected by the enrollment officer for inclusion in the File. The point selection routine proceeds as long as the number of points that have been reviewed $N_{ck}$ is less than the number of points R extracted in the first scan. As indicated at decision box 62a the selection routine terminates once the enrollment officer has selected forty points. If fewer than forty points have been selected, the routine continues as indicated at 62b, 62c and 62d with the enrollment officer picking points one at a time until the number of points reviewed exceeds R or the number of points selected is equal to forty.

If, after all of the points R in the scan have been reviewed and the number selected is not equal to forty, then as indicated by the decision box 62e, the enrollment officer can either decide to take a second scan or to terminate the process and settle for fewer than forty points in the file. If a second scan is taken, the counter $N_{ck}$ indicating the number of points received has to be reset to "one" but the number of points selected counter $N_{yes}$ is not reset. On the second scan, the enrollment officer by use of judgement can select whatever additional points are desired until a total of forty have been selected between the two scans or until the enrollment officer decides to end the selection process and settle for less than forty points in the File.

FIGS. 9 and 10 illustrate an optical scanning technique that may be employed to provide the basic image and data from which the Search points are extracted that are placed in the store 12.

FIGS. 9 and 10 indicate a known mechanism for optically scanning a fingerprint to provide the modulated light beam input to a CCD array 77. Since it is described in the issued U.S. Pat. No. 4,322,163, the disclosure here need not be in great detail. Suffice it, therefore, to say that a beam of light such as may be provided by a laser 66 is appropriately collimated by lenses 68 and 70 to provide the interrogating beam 71. A substantially transparent platen 62 is provided as a base on which an individual finger F may be placed. The platen 72 is mounted in a movable carriage 74 which permits moving the finger across the interrogating beam 71. As a consequence, the pattern of ridges and valleys provided at the back surface of the platen 72 causes the reflected light beam 75 to be modulated with fingerprint information. A focusing lens 76 focuses the image carried by the reflected light beam onto a linear array 77 of photo responsive diodes.

An encoder element 78 which is affixed to the carriage 74 responds to movement of carriage 76 to produce a synchronizing signal each time the carriage moves a predetermined distance. The synchronizing signal causes the scanning circuit 80 to sequentially interrogate each of the photodiodes comprising the array 77. Thus the output of the scanning circuit 80 is a train of pulses for each scan line. Each pulse represents a picture element or pixel.

It should be kept in mind that the scanning mechanism of FIGS. 9 and 10 is but one example of the finger scanning techniques with which the matcher device of this invention may be used.

Thus the input to the array 77 can be the modulated light beam that is produced from a scan of a fingerprint card or the direct scan of a finger positioned in space without a platen.

What I claim is:

1. A matcher improvement for matching a set of Search identification points against a set of File identification points employing a difference table, comprising:
   first memory means for storing a set of Search identification points as a set of binary value signals,
   second memory means for storing a set of File identification points as a set of binary value signals,
   multiple comparator means, each of said comparator means being coupled to a predetermined subset of said Search identification points and to a corresponding predetermined subset of said File identification points, each of said multiple comparative means having:
   (i) differencing means to provide a first difference table and a first proximity value for each entry on said difference table,
   (ii) constant adjustment means to provide a difference plane translation of that entry in said difference table which has the highest proximity value to the origin of the difference plane represented by said difference table, all of the entries in said difference table being translated by the same amount,
   (iii) differential adjustment means to differentially adjust each entry in said difference table as a function of the distance between the Search point of the entry being adjusted and the Search point of the entry having the highest proximity value,
   (iv) means to provide a final set of proximity values based on the difference table provided by said constant and said differential adjustment means, and
   (v) means to provide at least one figure of merit based on said final set of proximity values for the Search subset involved, and
   means to combine said figures of merit from each of said subsets to provide at least one overall figure of merit indicating the degree of match between said set of Search points and said set of File points.

2. The matcher of claim 1 wherein: said File point and Search point signals represent minutia identification points on the image plane of a fingerprint and said subsets of File points are overlapping subsets on the image plane.

3. The matcher of claim 2 further comprising: limiting means to provide a final difference table that is limited to a predetermined number of entries based on those entries having the highest proximity values in the difference table provided by said constant and said differential adjustment means.

4. The matcher of claim 2 wherein: each of said multiple differencing means includes,
   means to provide an intial difference table based on the associated ones of said subsets of Search and File identification point signals and to provide an initial proximity value for each entry on said initial difference table, and
   means to extract from said initial difference table a set of entries representing no duplicate Search point entries, said extracted set of entries being based on those entries in said initial difference table having the higher proximity values, and to provide a purged difference table based on said extracted entries, said purged difference table being said first difference table for which said constant and differential adjustment means provides said translation and differential adjustment.

5. The matcher of claim 4 further comprising: limiting means to provide a final difference table that is limited to a predetermined number of entries based on those entries having the highest proximity values in the difference table provided by said constant and said differential adjustment means.

6. The matcher of claim 5 further comprising: first window means to limit the entries of said initial difference table to Search and File points within a predetermined distance on the image plane from each other.

7. The matcher of claim 6 further comprising: second window means to limit the entries of said final difference table to difference table entry comparisons within a predetermined distance on the difference plane from each other.

8. The matcher of claim 4 further comprising: first window means to limit the entries of said inital difference table to Search and File points within a predetermined distance on the image plane from each other.

9. The matcher of claim 8 further comprising: second window means to limit the entries of said final difference table to difference table entry comparisons within a predetermined distance on the difference plane from each other.

10. The matcher of claim 1 wherein: each of said multiple differencing means includes,
   means to provide an initial difference table based on the associated ones of said subsets of Search and File identification point signals and to provide an initial proximity value for each entry on said initial difference table, and
   means to extract from said initial difference table a set of entries representing no duplicate Search point entries, said extracted set of entries being based on those entries in said initial difference table having the higher proximity values, and to provide a purged difference table based on said extracted entries, said purged difference table being said first difference table for which said constant and differential adjustment means provides said translation and differential adjustment.

11. The matcher of claim 10 further comprising: limiting means to provide a final difference table that is limited to a predetermined number of entries based on those entries having the highest proximity values in the difference table provided by said constant and said differential adjustment means.

12. The matcher of any of claims 1 or 2 through 7 wherein the number of said comparator means is at least four, said comparator means dividing said image into at least four subsets along a first axis.

13. The matcher of any of claim 1 or 2 through 7 therein the number of said computer means is sixteen, said sixteen comparator means dividing said image into a two dimensional matrix of four by four subsets.

14. The machine method of automatically matching a set of File identification points against a set of Search identification points employing a difference table, comprising:
   storing a set of Search identification points, as a set of binary value signals, in a first memory means,
   storing a set of File identification points, as a set of binary value signals, in a second memory means,
   segmenting said set of Search points and said set of File points into predetermined corresponding subsets,
   for each of said corresponding Search and File subsets, comparing the individual Search and File points, said step of comparing, including:
      (i) providing a first difference table for the corresponding set of Search and File points, said difference table having a first proximity value for each entry therein,
      (ii) shifting the entry on said difference table having the highest proximity value to the origin of the difference plane represented by said difference table, and shifting all of the other entries on said difference table by the same amount, and
      (iii) then differentially adjusting each of said entries on said difference table as a function of the distance between the Search point of the entry being adjusted and the Search point of the entry having the highest proximity value,
      (iv) providing a final set of proximity values for the difference table provided by said steps of shifting and differentially adjusting, and
      (v) providing at least one figure of merit based on said final set of proximity values for the Search subset involved, and
   combining said figures of merit from each of said Search subsets to provide at least one overall figure of merit indicating the degree of match between said set of Search points and said set of File points.

15. The method of claim 14 wherein: said File point and Search point signals represent minutia identification points on the image plane of a fingerprint and said subsets of File points are overlapping subsets on the image plane.

16. The method of claim 15 wherein said step of comparing further comprises the steps of:
   providing an initial difference table for the corresponding subset of Search and File points,
   providing an initial proximity value for each entry on said initial difference table,
   extracting a purged difference table from said initial difference table, said purged difference table being limited to a set of entries having no duplicate Search point entries, the entries in said purged difference table being based on those entries in said initial difference table having the higher proximity values, said purged difference table being the difference table for said steps of shifting and differentially adjusting.

17. The method of claim 16 further comprising the step of providing a final difference table that is limited to a predetermined number of entries based on those entries having the highest proximity values in the table provided by said constant and said differential adjustment means.

18. The method of any of claim 14 or 15 through 74 wherein the number of said subsets in said step of segmenting is at least four to divide said image into at least four subsets along a first axis.

19. The method of any of claims 14 or 15 through 74 wherein the number of said subsets in said step of segmenting is sixteen, to divide said image into a two dimensional matrix of four by four subsets.

* * * * *